(12) United States Patent
Asghari et al.

(10) Patent No.: US 11,796,677 B2
(45) Date of Patent: Oct. 24, 2023

(54) OPTICAL SENSOR SYSTEM

(71) Applicant: SiLC Technologies, Inc., Monrovia, CA (US)

(72) Inventors: Mehdi Asghari, La Canada Flintridge, CA (US); Dazeng Feng, El Monte, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 1191 days.

(21) Appl. No.: 16/130,562

(22) Filed: Sep. 13, 2018

(65) Prior Publication Data

US 2020/0025926 A1  Jan. 23, 2020

Related U.S. Application Data

(60) Provisional application No. 62/700,752, filed on Jul. 19, 2018.

(51) Int. Cl.
| | |
|---|---|
| *G01P 3/36* | (2006.01) |
| *G01S 17/58* | (2006.01) |
| *G01S 7/481* | (2006.01) |
| *G01S 7/497* | (2006.01) |
| *G01S 7/48* | (2006.01) |

(52) U.S. Cl.
CPC ............ *G01S 17/58* (2013.01); *G01S 7/4808* (2013.01); *G01S 7/4811* (2013.01); *G01S 7/4818* (2013.01); *G01S 7/497* (2013.01)

(58) Field of Classification Search
CPC ........ G01S 17/58; G01S 7/4818; G01S 7/497; G01S 7/4808; G01S 7/4811; G01S 7/4815; G01S 17/931; G01S 17/42; G01S 17/34; G01S 7/4812; G01S 7/4813; G01S 17/89

See application file for complete search history.

(56) References Cited

U.S. PATENT DOCUMENTS

| | | | |
|---|---|---|---|
| 5,323,223 A * | 6/1994 | Hayes | ............... G01S 17/42 356/28.5 |
| 9,157,790 B2 | 10/2015 | Shpunt | |
| 2010/0271614 A1 | 10/2010 | Albuquerque et al. | |
| 2013/0083389 A1 | 4/2013 | Dakin et al. | |

(Continued)

FOREIGN PATENT DOCUMENTS

| | | |
|---|---|---|
| EP | 2796890 A1 | 10/2014 |
| JP | 2017-524918 A | 8/2017 |
| JP | 2018-512600 A | 5/2018 |

OTHER PUBLICATIONS

Baghmisheh, B., "Chip-scale Lidar", Jan. 19, 2017, Electrical Engineering and Computer Sciences, University of California at Berkeley.

(Continued)

*Primary Examiner* — Samantha K Nickerson
(74) *Attorney, Agent, or Firm* — Gavrilovich, Dodd & Lindsey LLP

(57) ABSTRACT

A LIDAR system includes a LIDAR chip and local electronics that receive signals from the LIDAR chip. The local electronics are configured to operate one or more components on the LIDAR chip such that the LIDAR chip transmits an optical data signal from the LIDAR chip such that optical data signal includes data generated from the signals received from the LIDAR chip.

18 Claims, 11 Drawing Sheets

(56) References Cited

U.S. PATENT DOCUMENTS

| | | | |
|---|---|---|---|
| 2015/0346340 A1* | 12/2015 | Yaacobi | G01S 7/4915 |
| | | | 356/5.11 |
| 2017/0098917 A1* | 4/2017 | Popovic | H04J 14/02 |
| 2018/0149752 A1* | 5/2018 | Tadano | G01S 7/4808 |
| 2019/0018140 A1* | 1/2019 | Sarkissian | G01S 7/4914 |
| 2019/0072651 A1* | 3/2019 | Halmos | G01S 7/4816 |

OTHER PUBLICATIONS

Issakov, V., (2010) Introduction. In: Microwave Circuits for 24 GHz Automotive Radar in Silicon-based Technologies. Springer, Berlin, Heidelberg.
Kang, Sung Chul, International Search Report and Written Opinion, PCT/US2019/042078, Korean Patent Office, dated Oct. 30, 2019.
Li, L., (Jan. 2014), "Time of Flight Camera—An Introduction", TI Technical White Paper, SLOA190B.
Nickitas-Etienne, Athina, International Preliminary Report on Patentability and Written Opinion, PCT/US2019/042078, The International Bureau of WIPO, dated Jan. 28, 2021.

\* cited by examiner

OPTICAL SENSOR SYSTEM

RELATED APPLICATIONS

This application claims the benefit of U.S. Provisional Patent Application Ser. No. 62/697,266, filed on Jul. 12, 2018, entitled "Optical Sensor System," and incorporated herein in its entirety.

FIELD

The invention relates to optical devices. In particular, the invention relates to LIDAR chips.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) sensors are used to construct a 3D image of a target scene by illuminating the scene with laser light and measuring the returned signal.

Frequency Modulated Continuous Wave (FMCW) is an example of a coherent detection method that can be used for LIDAR applications. The FMCW technique is capable of determining the distance and/or radial velocity between an object and a source of a LIDAR output signal. Additionally, FMCW techniques have reduced sensitivity to ambient light and light from other LIDAR systems.

An integrated FMCW LIDAR chip is not yet available. Additionally, efforts to generate chips that have a portion of the LIDAR chip components have been limited in the amount of optical power they can transmit without signal degradation. This signal degradation limits the amount of transmitted laser power to the reflecting object. This limit to the amount of transmitted laser power limits overall sensitivity of the device. For these reasons, there is a need for a platform capable of integrating the LIDAR chip.

SUMMARY

A LIDAR chip includes a utility waveguide that carries an outgoing LIDAR signal to a facet through which the outgoing LIDAR signal exits from the chip. An optical component combines a first portion of a reference signal with a first portion of a comparative signal. The reference signal includes a portion of the light from the outgoing LIDAR signal before the outgoing LIDAR signal exits from the chip and the comparative signal includes light reflected off an object located off the chip. The chip includes second optical component that combines a second portion of the reference signal with a second portion of the comparative signal, the second portion of the reference signal being phase shifted relative to the first portion of the reference signal. In some instances, the phase shift is ninety degrees.

A LIDAR system includes electronics in electrical communication with a LIDAR chip. The electronics receive multiple data electrical signals from a LIDAR chip and perform a Complex Fourier transform on a complex signal. One of the data electrical signals is a real component of the complex signal and another one of the data electrical signals is an imaginary component of the complex signal.

A method of identifying the radial velocity and/or distance between a reflecting object and source of a LIDAR output signal includes generating multiple data electrical signals and performing a Complex Fourier transform on a complex signal where one of the data electrical signals is a real component of the complex signal and another one of the data electrical signals is an imaginary component of the complex signal.

The LIDAR system has a LIDAR chip that includes an optical port through which a light signal exits from the optical chip. The light signal includes light reflected from an object off the chip.

Another embodiment of a LIDAR system includes a LIDAR chip and local electronics that receive signals from the LIDAR chip. The local electronics are configured to operate one or more components on the LIDAR chip so as to transmit an optical data signal from the LIDAR chip such that optical data signal includes data generated from the signals received from the LIDAR chip.

DESCRIPTION

A LIDAR chip is disclosed that includes LIDAR branch and one or more data processing branches. The LIDAR branch includes optical components for generating optical LIDAR signals that carry LIDAR data such as the distance and/or radial velocity between the LIDAR chip and a reflecting object located off the LIDAR chip. The one or more data processing branches include components for generating optical data signals that are used to transmit data to remote electronics. The data included in the optical data signals can include LIDAR data and/or other data.

The LIDAR chip is associated with local electronics. The local electronics can operate the LIDAR chip so as to generate the LIDAR signals. In some instances, the local electronics process the LIDAR signals and/or electrical signals generated from the LIDAR signals so as to generate the LIDAR data and encode the LIDAR data onto the optical data signals. The LIDAR chip can transmit the optical data signals to remote electronics. As a result, the one or more data processing branches provide a mechanism for communicating data from and/or about the LIDAR branch to remote electronics. The LIDAR branch and one or more data processing branches are disclosed using components that are suitable for construction on a variety of platforms such as the silicon-on-insulator (SOI) platform. Accordingly, an integrated LIDAR chip is disclosed.

Figure 1:
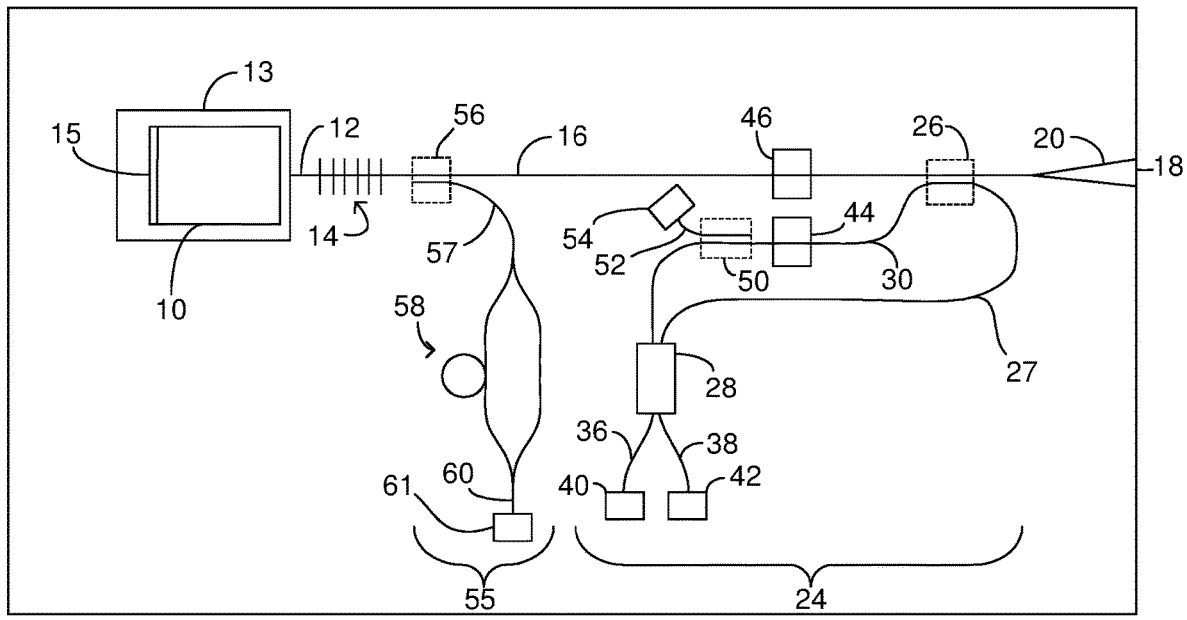
FIG. 1 is a top view of a LIDAR chip.
Figure 1:
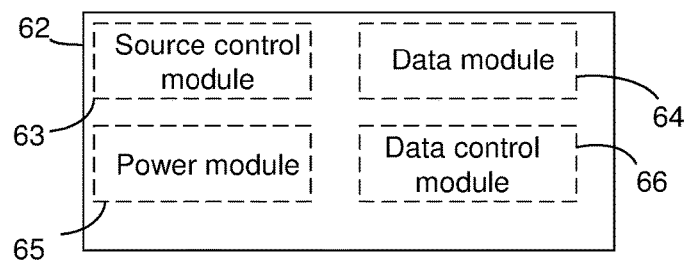

FIG. 1 is a topview of a LIDAR chip that includes a laser cavity. The laser cavity includes a light source 10 that can include or consist of a gain medium (not shown) for a laser. The chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used; for instance, mirrors can be used in conjunction with echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a laser cavity such as a Distributed Bragg Reflector (DBR) laser cavity. A DBR laser cavity has an inherently narrow-linewidth and a longer coherence length than DFB lasers and accordingly improves performance when an object reflecting the LIDAR output signal from the chip is located further away from the chip.

The partial return device 14 passes a portion of the light signal received from the cavity waveguide 12 to a utility waveguide 16 included on the chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the chip and serves as a LIDAR output signal. For instance, the facet 18 can be positioned at an edge of the chip so the outgoing LIDAR signal traveling through the facet 18 exits the chip and serves as a LIDAR output signal.

The LIDAR output signal travels away from the chip and is reflected by objects in the path of the LIDAR signal. The reflected signal travels away from the objects. At least a portion of the reflected signal returns to the facet 18 of the utility waveguide 16. Accordingly, a portion of the reflected signal can enter the utility waveguide 16 through the facet 18 and serve as a LIDAR input signal guided by the utility waveguide 16.

The utility waveguide 16 can include a tapered portion before the facet 18. For instance, the utility waveguide 16 can include a taper 20 that terminate at the facet 18. The taper 20 can relax the alignment tolerances required for efficient coupling of the utility waveguide 16 to the LIDAR input light and the outgoing LIDAR signal. Accordingly, the taper 20 can increase the percentage of the LIDAR input signal that is successfully returned to the chip for processing. In some instances, the taper 20 is constructed such that the facet 18 has an area that is more than two, five, or ten times the area of a cross section of a straight portion of the utility waveguide 16. Although FIG. 1 shows the taper 20 as a horizontal taper, the taper 20 can be a horizontal and/or vertical taper. The horizontal and/or vertical taper can be linear and/or curved. In some instances, the taper 20 is an adiabatic taper.

The chip includes a data branch 24 where the optical signals that are processed for LIDAR data are generated. The data branch includes an optical coupler 26 that moves a portion of the light signals from the utility waveguide 16 into the data branch. For instance, an optical coupler 26 couples a portion of the outgoing LIDAR signal from the utility waveguide 16 onto a reference waveguide 27 as a reference signal. The reference waveguide 27 carries the reference signal to a light-combining component 28.

The optical coupler 26 also couples a portion of the LIDAR input signal from the utility waveguide 16 onto a comparative waveguide 30 as a comparative signal. The comparative signal includes at least a portion of the light from the LIDAR input signal. The comparative signal can exclude light from the reference light signal. The comparative waveguide 30 carries the comparative signal to the light-combining component 28.

The illustrated optical coupler 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, multi-mode interference couplers (MMIs), and integrated optical circulators.

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal and the LIDAR input signal. In contrast, the comparative signal light includes light from the LIDAR input signal. For instance, the comparative signal can serve as a sample of the LIDAR input signal. Accordingly, the comparative signal has been reflected by an object located off the chip while the LIDAR output signal has not been reflected. When the chip and the reflecting object are moving relative to one another, the comparative signal and the reference signal have different frequencies due to the Doppler effect. As a result, beating occurs between the comparative signal and the reference signal.

The light-combining component 28 also splits the resulting composite sample signal onto a first detector waveguide 36 and a second detector waveguide 38. The first detector waveguide 36 carries a first portion of the composite sample signal to a first light sensor 40 that converts the first portion of the composite sample signal to a first electrical signal. The second detector waveguide 38 carries a second portion of the composite sample signal to a second light sensor 42 that converts the second portion of the composite sample signal to a second electrical signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal. For instance, the light combining component 28, the first light sensor 40 and the second light sensor 42 can be connected such that the DC components of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. In some instances, the functions of the illustrated light-combining component 28 are performed by more than one optical component or a combination of optical components.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×1 light-combining component. For instance, the illustrated light light-combining component can be a 2×1 MMI device. In these instances, the chip includes a single detector waveguide that carries the composite sample signal to the light sensor.

The data branch includes a data optical attenuator 44 positioned along the comparative waveguide 30 such that the data optical attenuator 44 can be operated so as to attenuate the comparative signal on the comparative waveguide 30. The chip also includes an output optical attenuator 46 positioned along the utility waveguide 16 such that the output optical attenuator 46 can be operated so as to attenuate the outgoing LIDAR signal on the utility waveguide 16. Suitable attenuators for the data optical attenuator 44 and/or the output optical attenuator 46 are configured to attenuate intensity of a light signal. Examples of a suitable attenuator configured to attenuate intensity of a light signal include carrier injection based PIN diodes, electro-absorption modulators, and Mach-Zehnder (MZ) modulators.

The chip also includes a sampling directional coupler 50 that couples a portion of the comparative signal from the comparative waveguide 30 onto a sampling waveguide 52. The coupled portion of the comparative signal serves as a sampling signal. The sampling waveguide 52 carries the sampling signal to a sampling light sensor 54. Although FIG. 1 illustrates a sampling directional coupler 50 moving a portion of the comparative signal onto the sampling waveguide 52, other signal tapping components can be used to move a portion of the comparative signal from the comparative waveguide 30 onto the sampling waveguide 52. Examples of suitable signal tapping components include, but are not limited to, y-junctions, and MMIs.

The chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zehnder interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency of the outgoing LIDAR signal. For instance, a Mach-Zehnder interferometer will output a sinusoidal control light signal with a fringe pattern. Changes to the frequency of the outgoing lidar signal will cause changes to the frequency of the control light signal. Accordingly, the frequency of the electrical control signal output from the control light sensor 61 is a function of the frequency of the outgoing lidar signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the chip. For instance, the electronics 62 can be in electrical communication with and control operation of the light source 10, the data optical attenuator 44, output optical attenuator 46, the first light sensor 40, the second light sensor 42, the sampling light sensor 54, and the control light sensor 61. Although the electronics 62 are shown off the chip, all or a portion of the electronics can be included on the chip. For instance, the chip can include electrical conductors that connect the first light sensor 40 in series with the second light sensor 42.

The electronics 62 can include a source control module 63. During operation of the chip, the source control module 63 can operate the light source 10 such that the laser cavity outputs the outgoing LIDAR signal. The source control module 63 can operate the light source through a series of cycles where each cycle generates at least a distance data point. During each cycle, the data signal is sampled multiple times. During each of the samples, the source control module 63 tune the frequency of the outgoing LIDAR signal. As will be described in more detail below, the source control module 63 can employ output from the control branch in order to control the frequency of the outgoing LIDAR signal such that the frequency of the outgoing LIDAR signal as a function of time is known to the electronics. In some instance, a cycle includes a first sample and a second sample. During the first sample, the source control module 63 can increase the frequency of the outgoing LIDAR signal and during a second sample the source control module 63 can decrease the frequency of the outgoing LIDAR signal. For instance, the laser cavity can be configured to output an outgoing LIDAR signal (and accordingly a LIDAR output signal) with a wavelength of 1550 nm. During the first sample, the source control module 63 can increase the frequency of the outgoing LIDAR signal (and accordingly a LIDAR output signal) such that the wavelength decreases from 1550 nm to 1459.98 nm followed by decreasing the frequency of the outgoing LIDAR signal such that the wavelength increases from 1459.98 nm to 1550 nm.

When the outgoing LIDAR signal frequency is increased during the first sample, the LIDAR output signal travels away from the chip and then returns to the chip as a LIDAR input signal. A portion of the LIDAR input signal becomes the comparative signal. During the time that the LIDAR output signal and the LIDAR input signal are traveling between the chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the chip, the more the frequency of the reference signal increases before the LIDAR input signal returns to the chip. Accordingly, the larger the difference between the frequency of the comparative signal and the frequency of the reference signal, the further the reflecting object is from the chip. As a result, the difference between the frequency of the comparative signal and the frequency of the reference signal is a function of the distance between the chip and the reflecting object.

For the same reasons, when the outgoing LIDAR signal frequency is decreased during the second sample, the comparative signal enters the light-combining component with a higher frequency than the reference signal concurrently entering the light-combining component and the difference between the frequency of the comparative signal and the frequency of the reference signal during the second sample is also function of the distance between the chip and the reflecting object.

In some instances, the difference between the frequency of the comparative signal and the frequency of the reference signal can also be a function of the Doppler effect because relative movement of the chip and reflecting object can also affect the frequency of the comparative signal. For instance, when the chip is moving toward or away from the reflecting object and/or the reflecting object is moving toward or away from the chip, the Doppler effect can affect the frequency of the comparative signal. Since the frequency of the comparative signal is a function of the radial velocity between the reflecting object and the LIDAR chip, the difference between the frequency of the comparative signal and the frequency of the reference signal is also a function of the speed the reflecting object is moving toward or away from the chip and/or the speed the chip is moving toward or away from the reflecting object. Accordingly, the difference between the frequency of the comparative signal and the frequency of the reference signal is a function of the distance between the chip and the reflecting object and is also a function of the Doppler effect.

The composite sample signal and the data signal each effectively compares the comparative signal and the reference signal. For instance, since the light-combining component combines the comparative signal and the reference signal and these signals have different frequencies, there is beating between the comparative signal and reference signal. Accordingly, the composite sample signal and the data signal have a beat frequency related to the frequency difference between the comparative signal and the reference signal and the beat frequency can be used to determine the difference in the frequency of the comparative signal and the reference signal. A higher beat frequency for the composite sample signal and/or the data signal indicates a higher differential between the frequencies of the comparative signal and the reference signal. As a result, the beat frequency of the data signal is a function of the distance between the chip and the reflecting object and is also a function of the Doppler effect.

The electronics 62 can include a data module 64 that can use the composite sample signal and the data signal to determine the distance between the chip and the reflecting object and/or the radial velocity of the chip and the reflecting object (i.e., the contribution of the Doppler effect). As noted above, the beat frequency is a function of two unknowns; the distance between the chip and the reflecting object and the radial velocity of the chip and the reflecting object (i.e., the contribution of the Doppler effect). The use of multiple different samples permits the data module 64 to resolve the two unknowns. For instance, the beat frequency determined for the first sample is related to the unknown distance and Doppler contribution and the beat frequency determined for the second sample is also related to the unknown distance and Doppler contribution. The availability of the two relationships allows the data module 64 to resolve the two unknowns. Accordingly, the distance between the chip and the reflecting object can be determined without influence from the Doppler effect. Further, in some instances, the data module 64 use this distance in combination with the Doppler effect to determine the radial velocity of the reflecting object toward or away from the chip.

In instances where the radial velocity of target and source is zero or very small, the contribution of the Doppler effect to the beat frequency is essentially zero. In these instances, the Doppler effect does not make a substantial contribution to the beat frequency and the electronics 62 can take only the first sample to determine the distance between the chip and the reflecting object.

During operation, the source control module 63 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the source control module 63 can adjust the frequency of the outgoing LIDAR signal in response to the magnitude of the electrical control signal. For instance, while changing the frequency of the outgoing LIDAR signal during one of the samples, the electronics 62 can have a range of suitable values for the electrical control signal magnitude as a function of time. At multiple different times during a sample, the source control module 63 can compare the electrical control signal magnitude to the range of values associated with the current time in the sample. If the electrical control signal magnitude indicates that the frequency of the outgoing LIDAR signal is outside the associated range of electrical control signal magnitudes, the source control module 63 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the source control module 63 does not change the frequency of the outgoing LIDAR signal.

The electronics 62 can include a power module 65 configured to operate the output optical attenuator 46. During operation, the power module 65 can adjust the level of attenuation provided by the output optical attenuator 46 in response to the sampling signal from the sampling light sensor 54. For instance, the power module 65 can operate the output optical attenuator 46 so as to increase the level of attenuation in response to the magnitude of the sampling signal being above a first signal threshold and/or decrease the magnitude of the power drop in response to the magnitude of the sampling signal being below a second signal threshold.

In some instance, the power module 65 adjusts the level of attenuation provided by the output optical attenuator 46 to prevent or reduce the effects of back-reflection on the performance of the laser cavity. For instance, the first signal threshold and/or the second signal threshold can optionally be selected to prevent or reduce the effects of back-reflection on the performance of the laser cavity. Back reflection occurs when a portion of the LIDAR input signal returns to the laser cavity as a returned LIDAR signal. In some instances, on the order of 50% of the LIDAR input signal that passes through the facet 18 returns to the laser cavity. The returned LIDAR signal can affect performance of the laser cavity when the power of the returned LIDAR signal entering the partial return device 14 does not decrease below the power of the outgoing LIDAR signal exiting from the partial return device 14 ("power drop") by more than a minimum power drop threshold. In the illustrated chip, the minimum power drop threshold can be around 35 dB (0.03%). Accordingly, the returned lidar signal can affect the performance of the laser cavity when the power of the returned LIDAR signal entering the partial return device 14 is not more than 35 dB below the power of the outgoing LIDAR signal exiting from the partial return device 14.

The power module 65 can operate the output optical attenuator 46 so as to reduce the effect of low power drops, e.g. when the target object is very close or highly reflective or both. As is evident from FIG. 1, operation of the output optical attenuator 46 so as to increase the level of attenuation reduces the power of the returned LIDAR signal entering the partial return device 14 and also reduces the power of the returned outgoing LIDAR signal at a location away from the partial return device 14. Since the output optical attenuator 46 is located apart from the partial return device 14, the power of the outgoing LIDAR signal exiting from the partial return device 14 is not directly affected by the operation of the output optical attenuator 46. Accordingly, the operation of the output optical attenuator 46 so as to increase the level of attenuation increases the level of the power drop. As a result, the electronics can employ the optical attenuator 46 so as to tune the power drop.

Additionally, the magnitude of the sampling signal is related to the power drop. For instance, the magnitude of the sampling signal is related to the power of the comparative signal as is evident from FIG. 1. Since the comparative signal is a portion of the lidar input signal, the magnitude of the sampling signal is related to the power of the lidar input signal. This result means the magnitude of the sampling signal is also related to the power of the returned LIDAR signal because the returned LIDAR signal is a portion of the lidar input signal. Accordingly, the magnitude of the sampling signal is related to the power drop.

Since the magnitude of the sampling signal is related to the power drop, the power module 65 can use the magnitude of the sampling signal to operate the output optical attenuator so as to keep the magnitude of the comparative signal power within a target range. For instance, the power module 65 can operate the output optical attenuator 46 so as to increase the magnitude of the power drop in response to the sampling signal indicating that the magnitude of power drop is at or below a first threshold and/or the electronics 62 can operate the output optical attenuator 46 so as to decrease the magnitude of the power drop in response to the sampling signal indicating that the magnitude of power drop is at or above a second threshold. In some instances, the first threshold is greater than or equal to the minimum power drop threshold. In one example, the power module 65 operates the output optical attenuator 46 so as to increase the magnitude of the power drop in response to the magnitude of the sampling signal being above a first signal threshold and/or decrease the magnitude of the power drop in response to the magnitude of the sampling signal being below a second signal threshold. The identification of the value(s) for one, two, three, or four variables selected from the group consisting of the first threshold, the second threshold, the first signal threshold, and the second signal threshold can be determined from calibration of the optical chip during set-up of the LIDAR chip system.

The electronics 62 can include a data control module 66 configured to operate the data optical attenuator 44. Light sensors can become saturated when the power of the composite light signal exceeds a power threshold. When a light sensor becomes saturated, the magnitude of the data signal hits a maximum value that does not increase despite additional increases in the power of the composite light signal above the power threshold. Accordingly, data can be lost when the power of the composite light signal exceeds a power threshold. During operation, the data control module 66 can adjust the level of attenuation provided by the data optical attenuator 44 so the power of the composite light signal is maintained below a power threshold.

As is evident from FIG. 1, the magnitude of the sampling signal is related to the power of the comparative signal. Accordingly, the data control module 66 can operate the data optical attenuator 44 in response to output from the sampling signal. For instance, the data control module 66 can operate the data optical attenuator so as to increase attenuation of the comparative signal when the magnitude of the sampling signal indicates the power of the comparative signal is above an upper comparative signal threshold and/or can operate the data optical attenuator so as to decrease attenuation of the comparative signal when the magnitude of the sampling signal indicates the power of the comparative signal is below a lower comparative signal threshold. For instance, in some instances, the data control module 66 can increase attenuation of the comparative signal when the magnitude of the sampling signal is at or above an upper comparative threshold and/or the data control module 66 decrease attenuation of the comparative signal when the magnitude of the sampling signal is at or below an upper comparative signal threshold.

As noted above, the electronics 62 can adjust the level of attenuation provided by the output optical attenuator 46 in response to the sampling signal. The electronics 62 can adjust the level of attenuation provided by the data optical attenuator 44 in response to the sampling signal in addition or as an alternative to adjusting the level of attenuation provided by the output optical attenuator 46 in response to the sampling signal.

Figure 2:
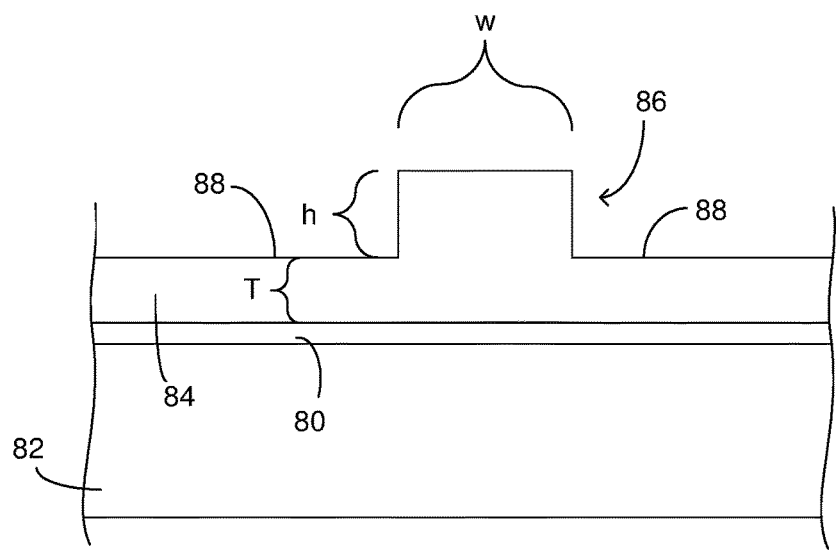
FIG. 2 is a cross-section of a LIDAR chip according to FIG. 1 constructed from a silicon-on-insulator wafer.

Suitable platforms for the chip include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 80 between a substrate 82 and a light-transmitting medium 84. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1 can be positioned on or over the top and/or lateral sides of the substrate.

The portion of the chip illustrated in FIG. 2 includes a waveguide construction that is suitable for use with chips constructed from silicon-on-insulator wafers. A ridge 86 of the light-transmitting medium extends away from slab regions 88 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions are more important than other applications because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide while curved portions of the waveguide and/or tapered portions of the waveguide have dimensions outside of these ranges. For instance, the tapered portions of the utility waveguide 16 illustrated in FIG. 1 can have a width and/or height that is >4 µm and can be in a range of 4 µm to 12 µm. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides selected from the group consisting of the cavity waveguide 12, utility waveguide 16, reference waveguide 27, comparative waveguide 30, first detector waveguide 36, second detector waveguide 38, sampling waveguide 52, control waveguide 57, and interferometer waveguide 60.

The light source 10 that is interfaced with the utility waveguide 16 can be a gain element that is a component separate from the chip and then attached to the chip. For instance, the light source 10 can be a gain element that is attached to the chip using a flip-chip arrangement.

Use of flip-chip arrangements is suitable when the light source 10 is to be interfaced with a ridge waveguide on a chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the chip and then attached to the chip. For instance, the attenuator can be included on an attenuator chip that is attached to the chip in a flip-chip arrangement. The use of attenuator chips is suitable for all or a portion of the attenuators selected from the group consisting of the data attenuator and the control attenuator.

As an alternative to including an attenuator on a separate component, all or a portion of the attenuators can be integrated with the chip. For instance, examples of attenuators that are interfaced with ridge waveguides on a chip constructed from a silicon-on-insulator wafer can be found in U.S. Pat. No. 5,908,305, issued on Jun. 1 1999; each of which is incorporated herein in its entirety. The use of attenuators that are integrated with the chip are suitable for all or a portion of the light sensors selected from the group consisting of the data attenuator and the control attenuator.

Light sensors that are interfaced with waveguides on a chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the chip as illustrated in FIG. 1. Alternately, all or a portion the waveguides that terminate at a light sensor can terminate at a facet 18 located at an edge of the chip and the light sensor can be attached to the edge of the chip over the facet 18 such that the light sensor receives light that passes through the facet 18. The use of light sensors that are a separate component from the chip is suitable for all or a portion of the light sensors selected from the group consisting of the first light sensor 40, the second light sensor 42, the sampling light sensor 54, and the control light sensor 61.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 6,108, 8472, issued on Aug. 22, 2000 each of which is incorporated herein in its entirety. The use of light sensors that are integrated with the chip are suitable for all or a portion of the light sensors selected from the group consisting of the first light sensor 40, the second light sensor 42, the sampling light sensor 54, and the control light sensor 61.

Construction of optical gratings that are integrated with a variety of optical device platforms are available. For instance, a Bragg grating can be formed in a ridge waveguides by forming grooves in the top of the ridge and/or in the later sides of the ridge.

In some instances, it is desirable to scan the LIDAR output signal. The above chip construction is suitable for use with various scanning mechanisms used in LIDAR applications. For instance, the output LIDAR signal can be received by one or more reflecting devices and/or one more collimating devices. The one or more reflecting devices can be configured to re-direct and/or steer the LIDAR output signal so as to provide scanning of the LIDAR output signal. Suitable reflecting devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that is received in the utility waveguide 16. Suitable collimating devices include, but are not limited to, individual lenses and compound lenses.

Figure 3:
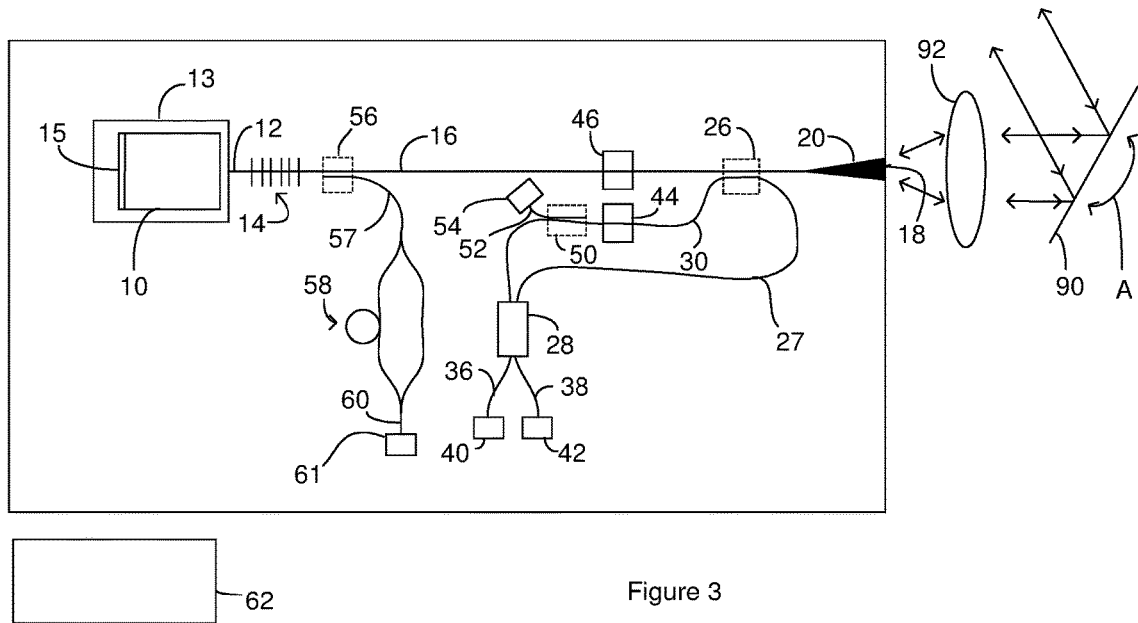
FIG. 3 illustrates the LIDAR chip of FIG. 1 used with an off-chip scanning mechanism.

FIG. 3 illustrates the above chip used with a reflecting device 90 and a collimating device 92. For instance, a lens serves as a collimating device that receives the LIDAR output signal and provides collimation of the LIDAR output signal. A mirror serves as a reflecting device 90 that receives the collimated LIDAR output signal and reflects the collimated LIDAR output signal in the desired direction. As is illustrated by the arrow labeled A, the electronics can move the mirror so as to steer the collimated LIDAR output signal and/or scan the collimated LIDAR output signal. The movement of the mirror can be in two dimensions or three dimensions. Suitable mirrors include, but are not limited to, mechanically driven mirrors and Micro Electro Mechanical System (MEMS) mirrors.

Figure 4:
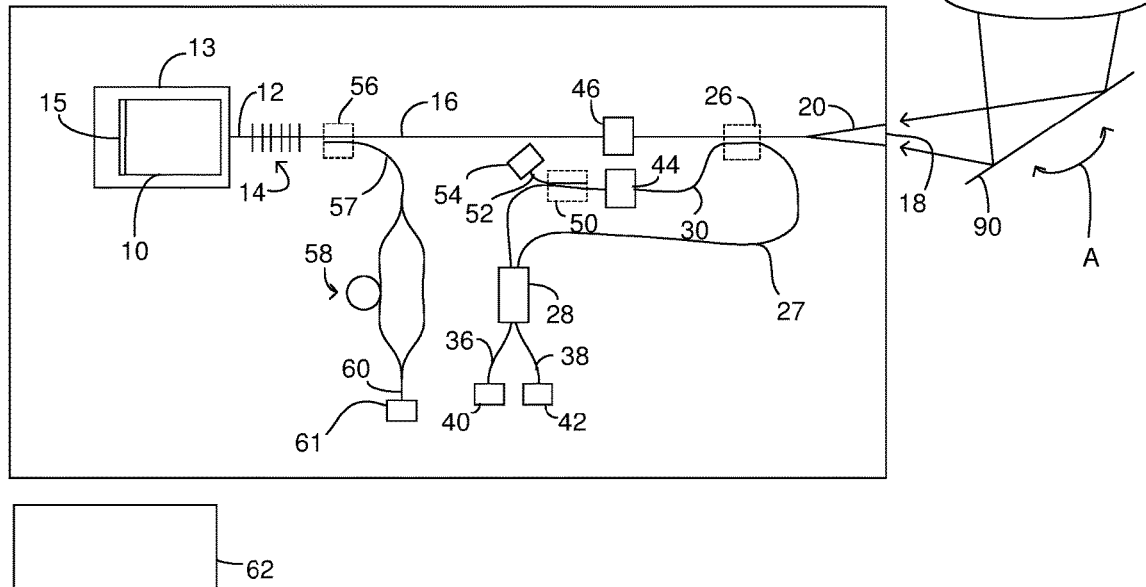
FIG. 4 illustrates the LIDAR chip of FIG. 1 used with another embodiment of an off-chip scanning mechanism.

FIG. 4 illustrates the above chip used with a reflecting device 90 and a collimating device 92. For instance, a mirror serves as a reflecting device 90 that receives the LIDAR output signal and reflects the LIDAR output signal in the desired direction. As is illustrated by the arrow labeled A, the electronics can move the mirror so as to steer the LIDAR output signal and/or scan the LIDAR output signal. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The movement of the mirror can be in two dimensions or three dimensions. Suitable mirrors include, but are not limited to, mechanically driven mirrors and Micro Electro Mechanical System (MEMS) mirrors.

Figure 5:
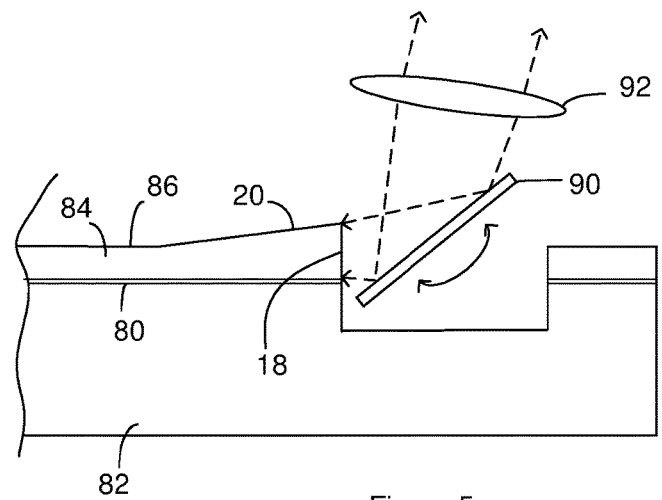
FIG. 5 is a cross section of the LIDAR chip of FIG. 1 having an integrated scanning mechanism.

Technologies such as SOI MEMS (Silicon-On-Insulator Micro Electro Mechanical System) technology can be used to incorporate a reflecting device such as a MEMS mirror into the chip. For instance, FIG. 5 is a cross section of a portion of the chip taken through the longitudinal axis of the utility waveguide 16. The illustrated chip was constructed on silicon-on-insulator waveguide. A mirror recess extends through the light-transmitting medium to the base. The mirror is positioned in the mirror recess such that the mirror receives the LIDAR output signal from the utility waveguide. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The electronics can control movement of the mirror in two or three dimensions.

Figure 6A:
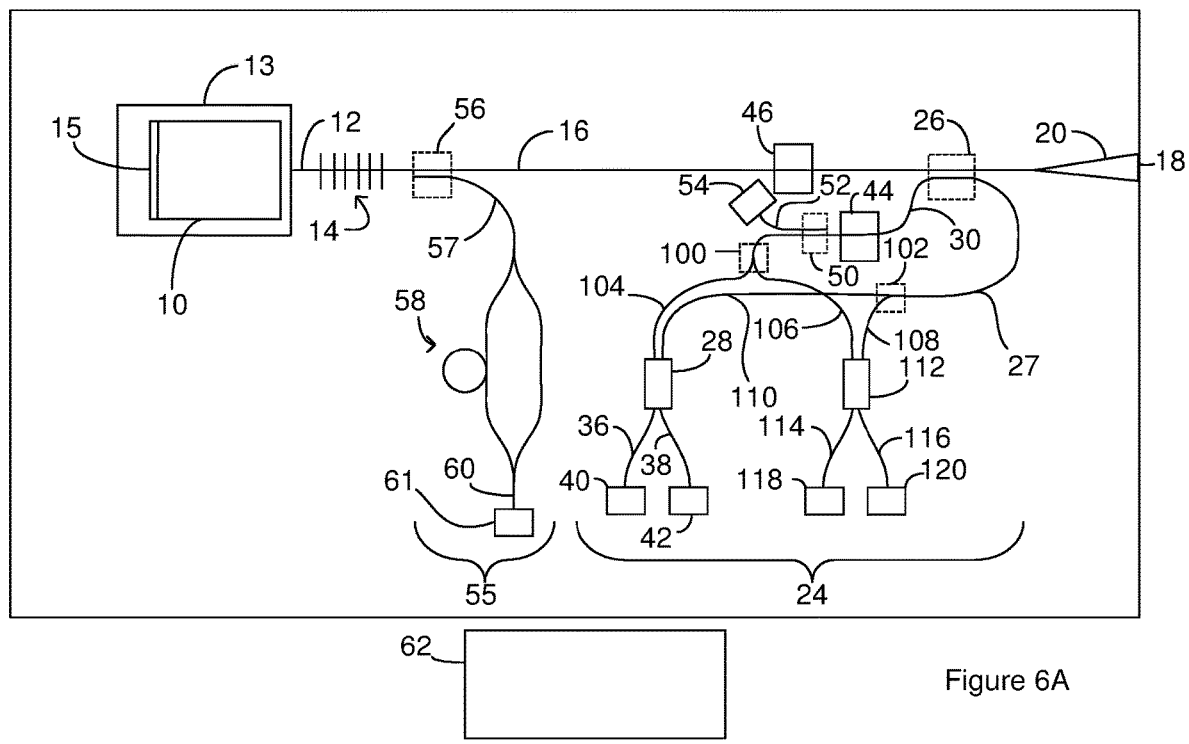
FIG. 6A illustrates the chip of FIG. 1 modified to include multiple different balanced detectors for further refining data generated by the chip.

The above chips can be modified so that the data branch includes one or more secondary branches and one or more secondary balanced detectors that can be employed to refine the optical data provided to the electronics. The reference signal and the comparative signal can be divided among the different balanced detectors. For instance, FIG. 6A illustrates the above chip modified to include two different balanced detectors. A first splitter 102 divides the reference signal carried on the reference waveguide 27 onto a first reference waveguide 110 and a second reference waveguide 108. The first reference waveguide 110 carries a first portion of the reference signal to the light-combining component 28. The second reference waveguide 108 carries a second portion of the reference signal to a second light-combining component 112.

A second splitter 100 divides the comparative signal carried on the comparative waveguide 30 onto a first comparative waveguide 104 and a second comparative waveguide 106. The first comparative waveguide 104 carries a first portion of the comparative signal to the light-combining component 28. The second comparative waveguide 108 carries a second portion of the comparative signal to the second light-combining component 112.

The second light-combining component 112 combines the second portion of the comparative signal and the second portion of the reference signal into a second composite signal. The light-combining component 112 also splits the resulting composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sinusoidal function. Accordingly, the portion of the reference signal in the first composite signal is phase shifted relative to the portion of the reference signal in the second composite signal, however, the portion of the comparative signal in the first composite signal is not phase shifted relative to the portion of the comparative signal in the second composite signal.

Figure 6B:
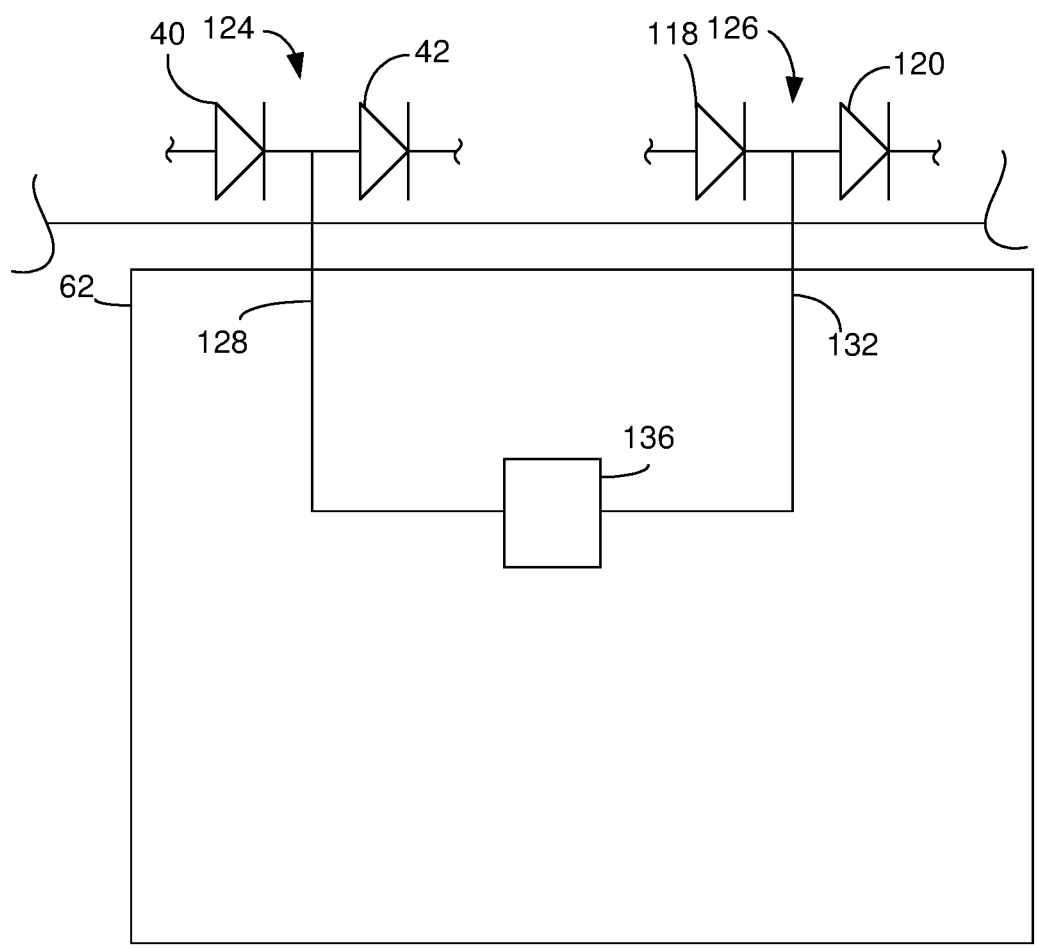
FIG. 6B provides a schematic of electronics that are suitable for use with the chip of FIG. 6A.

The first light sensor 40 and the second light sensor 42 can be connected as a balanced detector and the first auxiliary light sensor 118 and the second auxiliary light sensor 120 can also be connected as a balanced detector. For instance, FIG. 6B provides a schematic of the relationship between the data module 64 of the electronics 62, the first light sensor 40, the second light sensor 42, the first auxiliary light sensor 118, and the second auxiliary light sensor 120. The symbol for a photodiode is used to represent the first light sensor 40, the second light sensor 42, the first auxiliary light sensor 118, and the second auxiliary light sensor 120 but one or more of these sensors can have other constructions.

The electronics connect the first light sensor 40 and the second light sensor 42 as a first balanced detector 124 and the first auxiliary light sensor 118 and the second auxiliary light sensor 120 as a second balanced detector 126. In particular, the first light sensor 40 and the second light sensor 42 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the first balanced detector as a second data signal.

The first data line 128 carries the first data signal to a transform module 136 and the second data line 132 carries the second data signal to the transform module 136. The transform module is configured to perform a complex transform on a complex signal so as to convert the input from the time domain to the frequency domain. The first data signal can be the real component of the complex signal and the second data signal can be the imaginary component of the complex. The transform module can execute the attributed functions using firmware, hardware and software or a combination thereof.

Figure 6C:
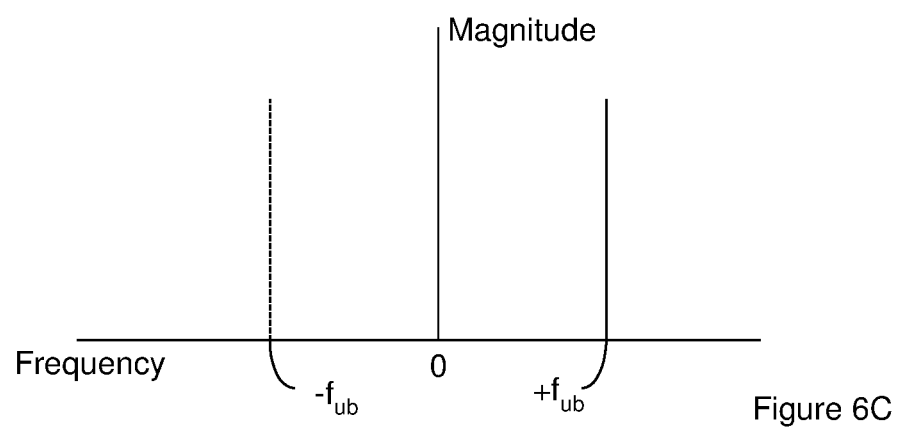
FIG. 6C is a graph of magnitude versus frequency. A solid line on the graph shows results for a Complex Fourier transform performed on output generated from the LIDAR chip of FIG. 6B.

The solid line in FIG. 6C provides an example of the output of the transform module when a Complex Fourier transform converts the input from the time domain to the frequency domain. The solid line shows a single frequency peak. The frequency associated with this peak is used by the data module as the frequency of the LIDAR input signal.

The data module uses this frequency for further processing to determine the distance and/or radial velocity of the reflecting object. FIG. 6C also includes a second peak illustrated by a dashed line. Prior methods of resolving the frequency of the LIDAR input signal made use of real Fourier transforms rather than the Complex Fourier transform technique disclosed above. These prior methods output both the peak shown by the dashed line and the solid line. As noted above, when using LIDAR applications, it can become difficult to identify the correct peak. Since the above technique for resolving the frequency generates a single solution for the frequency, the inventors have resolved the ambiguity with the frequency solution.

The data module use the single frequency that would be present in FIG. 6C to determine the distance of the reflecting object from the chip and/or the radial speed between the object and the chip. For instance, the following equation applies during a sample where electronics increase the frequency of the outgoing LIDAR signal: $+f_{ub}=-f_d+\alpha\tau_0$ where $f_{ub}$ is the frequency provided by the transform module, $f_d$ represents the Doppler shift ($f_d=2vf_c/c$) where $f_c$ is the frequency of the LIDAR output signal, $v$ is the radial velocity of the reflecting object relative to the chip where the direction from the reflecting object toward the chip is assumed to be the positive direction, and c is the speed of light, $\alpha$ is defined below, and $\tau_0$ is the roundtrip delay for a stationary reflecting object. The following equation applies during a sample where electronics decrease the frequency of the outgoing LIDAR signal: $-f_{db}=-f_d-\alpha\tau_0$ where $f_{db}$ is the frequency provided by the transform module. In these two equations, $v$ and $\tau_0$ are unknowns. The electronics solve these two equations for the two unknowns.

Suitable electronics can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

A single light sensor can replace the second balanced detector first light sensor 40 and the second light sensor 42 and/or a second light sensor can replace the first auxiliary light sensor 118 and the second auxiliary light sensor 120. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×1 light-combining component. For instance, the illustrated light light-combining component can be a 2×1 MMI device. In these instances, the chip includes a single detector waveguide that carries the composite signal to the light sensor.

When a single light sensor replaces the first auxiliary light sensor 118 and the second auxiliary light sensor 120, second light-combining component 112 need not include light-splitting functionality. As a result, the illustrated second light-combining component 112 can be a 2×1 light-combining component rather than the illustrated 2×2 light-combining component. For instance, the illustrated light light-combining component can be a 2×1 MMI device. In these instances, the chip includes a single detector waveguide that carries the composite signal from the second light-combining component 112 to the light sensor.

Figure 7:
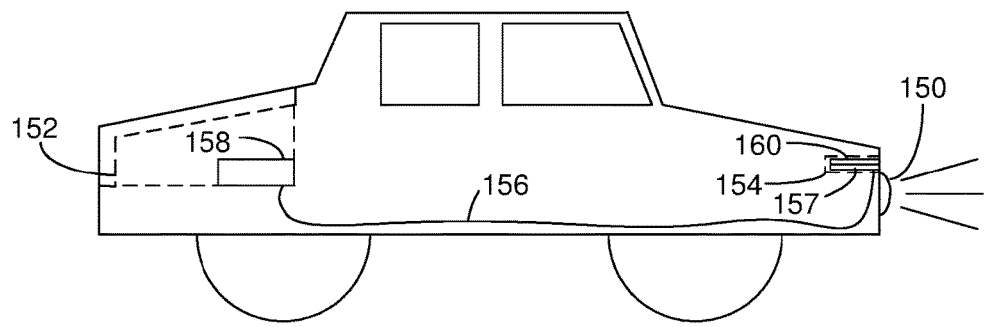
FIG. 7 is a diagram of a vehicle that includes a headlight 150 and a trunk 152. The car includes a LIDAR module 154 located near the headlight 150.

A vehicle can include one or more of the LIDAR chips. For instance, a car that has an ADAS (Advanced Driver Assistance System) and/or a self-driving vehicle can have an optical sensor system with a LIDAR module that includes, consists of, or consists essentially of one or more of the LIDAR chips. As an example, FIG. 7 is a diagram of a vehicle that includes a headlight 150 and a trunk 152. The car includes a LIDAR module 154 located near the headlight 150. For instance, the LIDAR module 154 can be located above, below, and/or beside the headlight 150. Although FIG. 7 illustrates the car having a single LIDAR module, the car can include multiple LIDAR modules. Each of the modules can include or consist of one or more LIDAR chips.

The car also includes a storage region that is remote from the LIDAR module 154 such as a compartment that is accessible from the trunk of a car. A communications link 156 provides communication between one or more LIDAR chips 157 included in the LIDAR module 154 and remote electronics 158 located in the storage region. The storage region is generally selected to protect the remote electronics 158 from the environment and, in some instances, to provide thermal control of the remote electronics 158. In addition to processing signals from one or more LIDAR modules, the remote electronics 158 generally processes the signals from a variety of different sensors in the vehicle. For instance, the remote electronics 158 can process signals from cameras, inertial sensors, rotational sensors, radar, infra-red (IR) cameras, radionavigation systems such as the Global Positioning System (GPS), and acoustic sensors such as microphones.

Due to the configuration of many vehicles, a communications link that is several meters long is often needed to make the circuitous route from a LIDAR module to the remote electronics. In many instances, the communication link needs to provide a data rate of more than 0.1 Gbps, more than 10 Gbps or even more than 20 Gbps for a length greater than 5 m, 10 m, or even 20 m as can occur in vehicles such a large trucks. Copper wires are often ineffective for carrying data at these rates over these lengths. Additionally, copper wires and cables for these data rates over these distances add greater weight to an autonomous vehicle and also generate more electromagnetic interference (EMI) and are more susceptible to EMI from other data signals. This is important for all autonomous vehicles, but will be especially important for airborne autonomous vehicles. A communication link that includes or consists of one or more optical fibers can provide the needed data rates at lengths longer than 5 m, 10 m, or 20 m. Additionally or alternately, a communication link that includes or consists of an optical fiber can be less than 100 m, 200 m, or 500 m.

The electronics 62 disclosed in the context of FIG. 1 through FIG. 6C can be divided between the remote electronics 158 and local electronics 160. All or a portion of the local electronics can be in the proximity of the LIDAR module 154. In some instances, all or a portion of the local electronics are included on one or more LIDAR chips in the LIDAR module 154. In some instances, all or a portion of the local electronics are included on one or more LIDAR chips in the LIDAR module 154. In some instances, all or a portion of the local electronics are included inside of packaging for the LIDAR module 154. In some instances, all or a portion of the local electronics are immobilized on packaging for the LIDAR module 154. Accordingly, the distance between the local electronics 160 and the LIDAR module 154 is less than the distance between the remote electronics 158 and the LIDAR module 154.

As noted above, the electronics 62 can include one or more modules selected from a group consisting of a source control module 63, a data module 64, a power module 65, and a data control module 66. In some instances, the local electronics 160 includes one, two, or three modules selected from the group consisting of the source control module 63, data module 64, power module 65, and data control module 66 and the remote electronics 158 includes one two or three modules selected from the group consisting of the source control module 63, data module 64, power module 65, and data control module 66.

Figure 8:
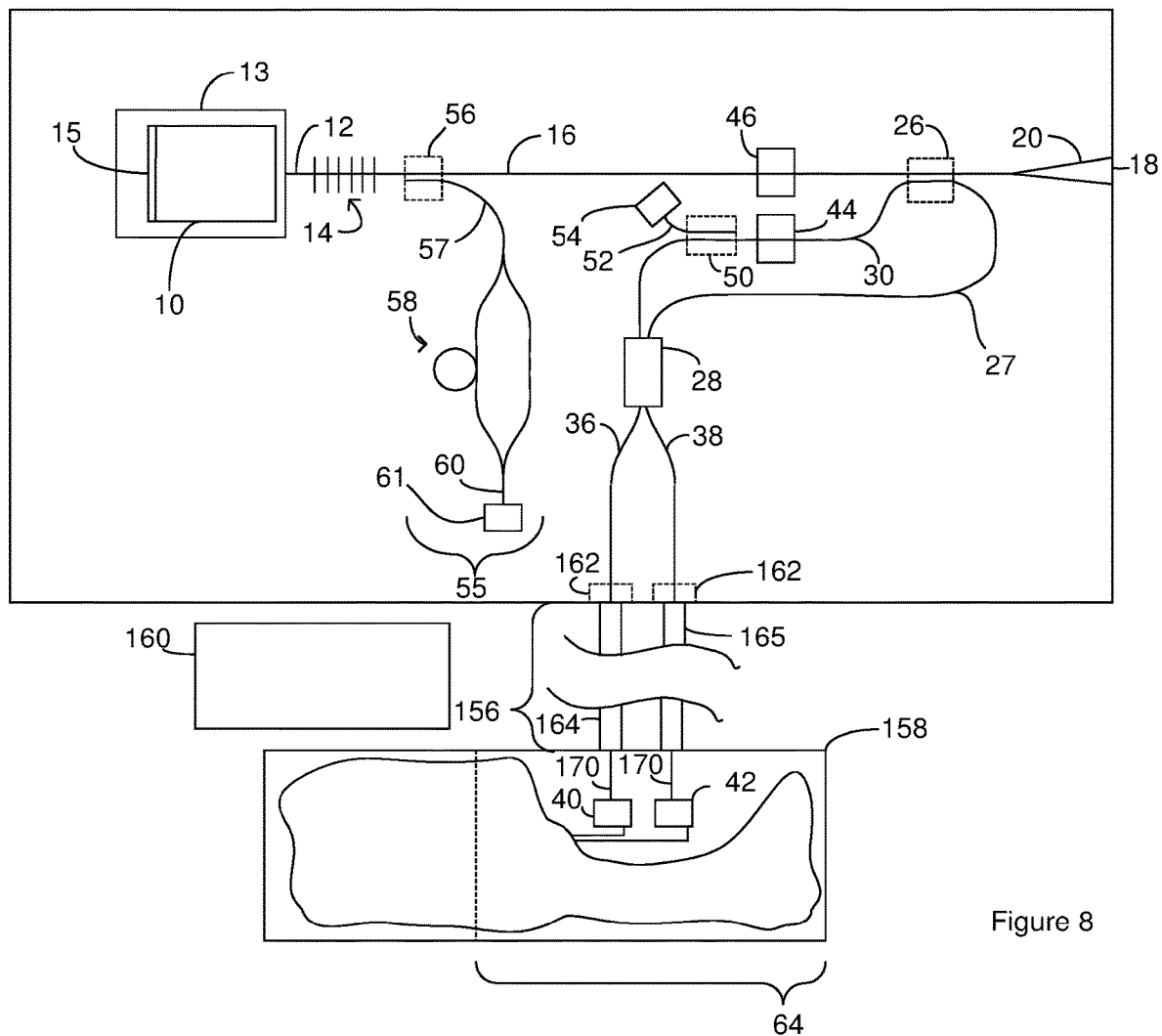
FIG. 8 illustrates a LIDAR system where electronics are distributed among remote electronics and local electronics.

In one example, the local electronics 160 include the source control module 63, data module 64, power module 65, and data control module 66 and the remote electronics 158 include the data module 64. Accordingly, the remote electronics 158 can include a portion of the components from the LIDAR chip illustrated above. For instance, when the remote electronics 158 include the data module 64, the remote electronics 158 can include the first light sensor 40 and the second light sensor 42 of the LIDAR chips disclosed in the context of FIG. 1 through FIG. 6C. Accordingly, the remote electronics 158 can include a balanced photodetector that includes the first light sensor 40 and the second light sensor 42 as illustrated in FIG. 8. In some instances, the remote electronics 158 can include the first auxiliary light sensor 118 and second auxiliary light sensor 120 in addition to the first light sensor 40 and the second light sensor 42 as disclosed in the context of FIG. 6A through FIG. 6B. Accordingly, the remote electronics 158 can include a balanced photodetector that includes the first light sensor 40 and the second light sensor 42 and a second balanced photodetector that includes the first auxiliary light sensor 118 and the second auxiliary light sensor 120 as illustrated in FIG. 9.

When the remote electronics 158 can include one or more light sensors selected from the group consisting of the first light sensor 40, the second light sensor 42, the first auxiliary light sensor 118 and the second auxiliary light sensor 120, the communications link 156 can include one or more optical fibers. For instance, FIG. 8 shows the communications link 156 having a first optical fiber 164 that guides the first portion of the composite sample signal to the remote electronics 158 and a second optical fiber 165 that guides the second portion of the composite sample signal to the remote electronics 158. The remote electronics 158 include a waveguide 170 that guides the first portion of the composite sample signal to the first light sensor 40 and a waveguide 170 that guides the second portion of the composite sample signal to the second light sensor 42.

Figure 9:
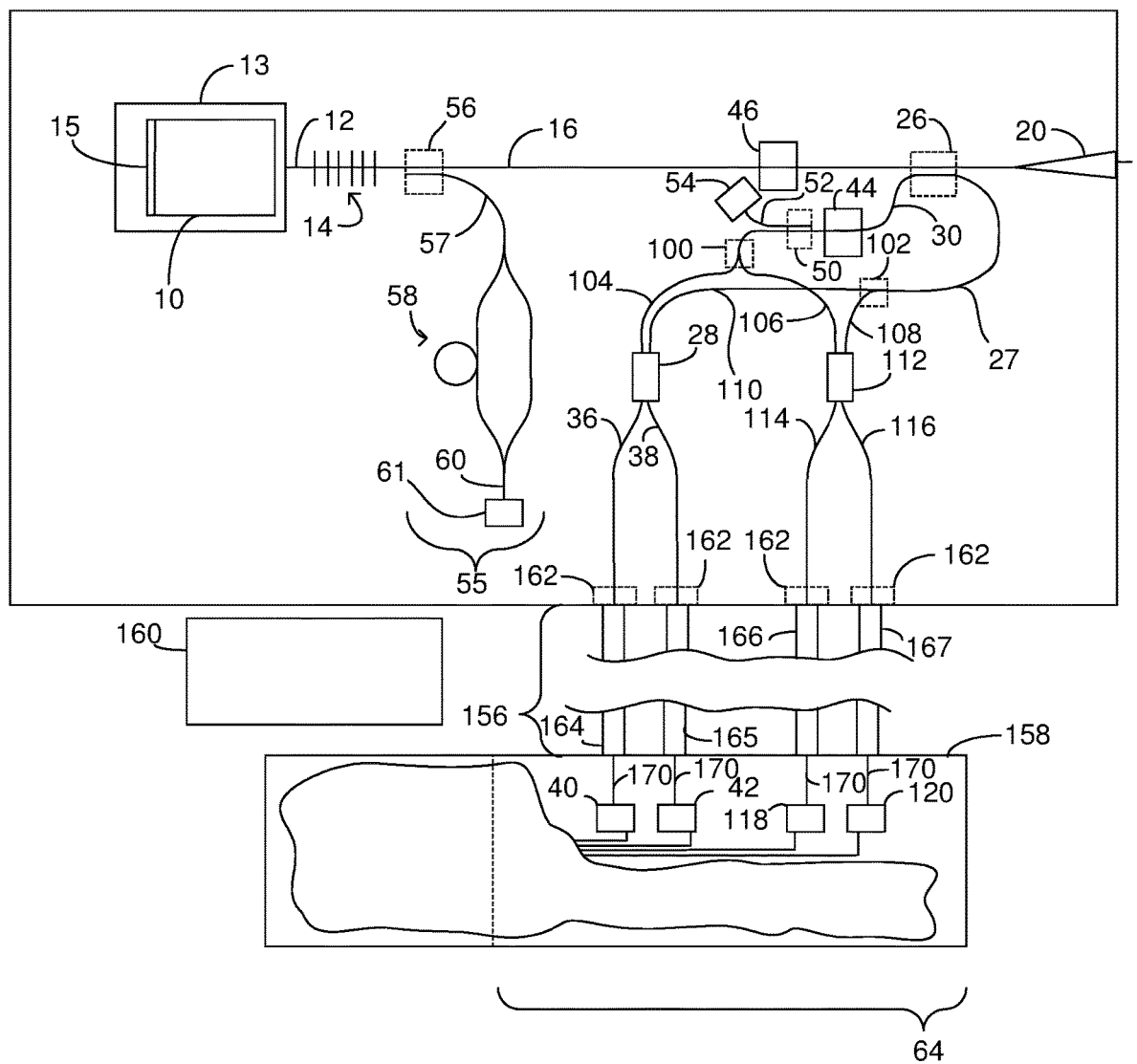
FIG. 9 illustrates an embodiment of a LIDAR system where optical components are distributed among remote electronics and a LIDAR chip.

FIG. 9 shows the LIDAR chip of FIG. 6A modified to be used with a communications link 156 that includes a first optical fiber 164 that guides the first portion of the composite sample signal to the remote electronics 158 and a second optical fiber 165 that guides the second portion of the composite sample signal to the remote electronics 158, a third optical fiber 166 that guides the first portion of the second composite signal to the remote electronics 158 and a fourth optical fiber 167 that guides the second portion of the second composite signal to the remote electronics 158. The remote electronics 158 includes a waveguide that guides the first portion of the composite sample signal to the first light sensor 40, a waveguide that guides the second portion of the composite sample signal to the second light sensor 42, a waveguide that guides the first portion of the second composite signal to the first auxiliary light sensor 118, and a waveguide that guides the second portion of the second composite signal to the second auxiliary light sensor 120. It is currently believed that a vehicle having a LIDAR chip and communications link 156 constructed according to FIG. 9 will carry data at rate of about 24 Gbps for two or more meters and possibly as many as 20 m. Over these distances, copper materials cannot effectively carry data at an equivalent of these digital rates.

When the optical link includes one or more optical fibers, the LIDAR chip can include an optical port 162 for providing optical communication between a waveguide on the LIDAR chip and the optical fiber. An optical signal can exit from the LIDAR chip through an optical port. For instance, a suitable optical port includes the waveguide ending at a facet through which an optical signal exits from the LIDAR chip. For instance, one or more waveguide selected from a group consisting of a first detector waveguide 36, a second detector waveguide 38, a first auxiliary detector waveguide 114 and a second auxiliary detector waveguide 116 can terminate at a facet that is optically aligned with a facet of an optical fiber. An optical port can be constructed such that a light signal output from the port exits the LIDAR chip above the LIDAR chip, below the LIDAR chip, or from an edge of the LIDAR. Although the optical port is disclosed in the context of optical signals exiting from the LIDAR chip, the LIDAR chip can additionally or alternately be operated such that light signals enter the LIDAR chip through an optical port. Suitable constructions of optical ports that providing optical communication between a waveguide and an optical fiber include, but are not limited to, U.S. Pat. No. 6,108,472, filed on Feb. 6, 1998, given Ser. No. 09/019,729, entitled "Device for Re-directing Light From Optical Waveguide," and incorporated herein in its entirety and in U.S. Pat. No. 7,245,803, filed on Feb. 10, 2004, given Ser. No. 10/776,475, entitled "Optical Waveguide Grating Coupler," and incorporated herein in its entirety.

In the LIDAR chip of FIG. 8 and FIG. 9, one or more light signals (LIDAR data signals) selected from the group consisting of the first portion of the composite sample signal, the second portion of the composite sample signal, the first portion of the second composite signal, and second portion of the second composite signal exit the LIDAR chip through an optical port. Each of these light signals includes light from the reflected signal. Accordingly, the light signal(s) that exit the LIDAR chip through an optical port can include light from the reflected signal. The first portion of the composite sample signal, the second portion of the composite sample signal, the first portion of the second composite signal, and the second portion of the second composite signal also include light from the reference signal. Accordingly, the light signal(s) that exit the LIDAR chip through an optical port can additionally or alternatively include light from a reference signal and/or light that is not reflected by an object. The light signal(s) that exit the LIDAR chip through an optical port can be digital or analog. However, the first portion of the composite sample signal, the second portion of the composite sample signal, the first portion of the second composite signal, and second portion of the second composite signal have not undergone digital processing and are accordingly analog signals. As a result, the light signal(s) that exit the LIDAR chip through an optical port can be analog signals that undergo digital processing off the chip and/or at the remote electronics 158.

Although the optical port is disclosed in the context of providing optical signals for a data module included in the remote electronics, a LIDAR chip can include one or more optical ports for other applications. For instance, a LIDAR chip can include an optical port that transmits optical signals for a source control module 63, power module 65, and/or data control module 66.

FIG. 8 and FIG. 9 illustrate the optical components from the LIDAR chip of FIG. 1 and FIG. 6A distributed between the LIDAR chip and the remote electronics. As an example, in FIG. 8, the remote electronics includes the first light sensor 40 and the second light sensor 42 from the LIDAR chip illustrated in FIG. 1. However other distributions of the optical components between the LIDAR chip and the remote electronics can be employed. As an example, the remote electronics can include the first light-combining component 28, the first detector waveguide 36, the second detector waveguide 38, the first light sensor 40, and the second light sensor 42 from the LIDAR chip illustrated in FIG. 1 and the remote electronics can have these optical components configured to operate as disclosed in the context of FIG. 1. In such an embodiment, the LIDAR chip can include an optical port through which the reference signal exits from the LIDAR chip and is received by the communication link. The LIDAR chip can include an optical port through which the comparative signal exits from the LIDAR chip. The communication link can then carry these light signals to the optical components on the remote electronics which can then process these light signals as disclosed in the context of FIG. 1. Other possible distributions of the optical components between the LIDAR chip and the remote electronics are disclosed in U.S. patent application Ser. No. 16/113,364, filed on Aug. 27, 2018, entitled "Optical Sensor System" and incorporated herein in its entirety.

The LIDAR system of FIG. 6A and FIG. 9A can be operated as described above so as to approximate the LIDAR data, however, other configurations are possible. For instance, a LIDAR chip constructed according to FIG. 6A and/or FIG. 9A and/or having optical components arranged according to FIG. 6A and/or FIG. 9A but distributed between the LIDAR chip and the remote electronics can be modified to include a modulator and operated so as to generate LIDAR data as is disclosed in U.S. Patent Application Ser. No. 62/727,453, filed on Sep. 5, 2015, and incorporated herein in its entirety and/or as disclosed in U.S. Patent Application Ser. No. 62/726,101, filed on Aug. 31, 2018.

In some instances, the local electronics 160 perform processing of one or more light signals on the LIDAR chip and then use components on the LIDAR to generate an optical data signal that includes data generated from these light signals. The electronics can transmit the optical data signal to the remote electronics 158 for additional processing. In some instances, the optical data signal is a digital signal. The one or more light signals processed by the local electronics 160 can be analog light signals. For instance, the local electronics 160 can process one or more of the LIDAR data signals (composite sample signal, the second portion of the composite sample signal, the first portion of the second composite signal, and second portion of the second composite signal). In some instances, the local electronics 160 process one or more of the LIDAR data signals so as to determine the distance and/or radial velocity between the reflecting object and the chip and/or vehicle. The local electronics 160 can then use one or more components on the LIDAR chip to generate an optical data signal that indicates the resulting radial velocity and/or distance. The optical data signal can be received on the communications link 156 which carries the optical data signal to the remote electronics 158.

Figure 10:
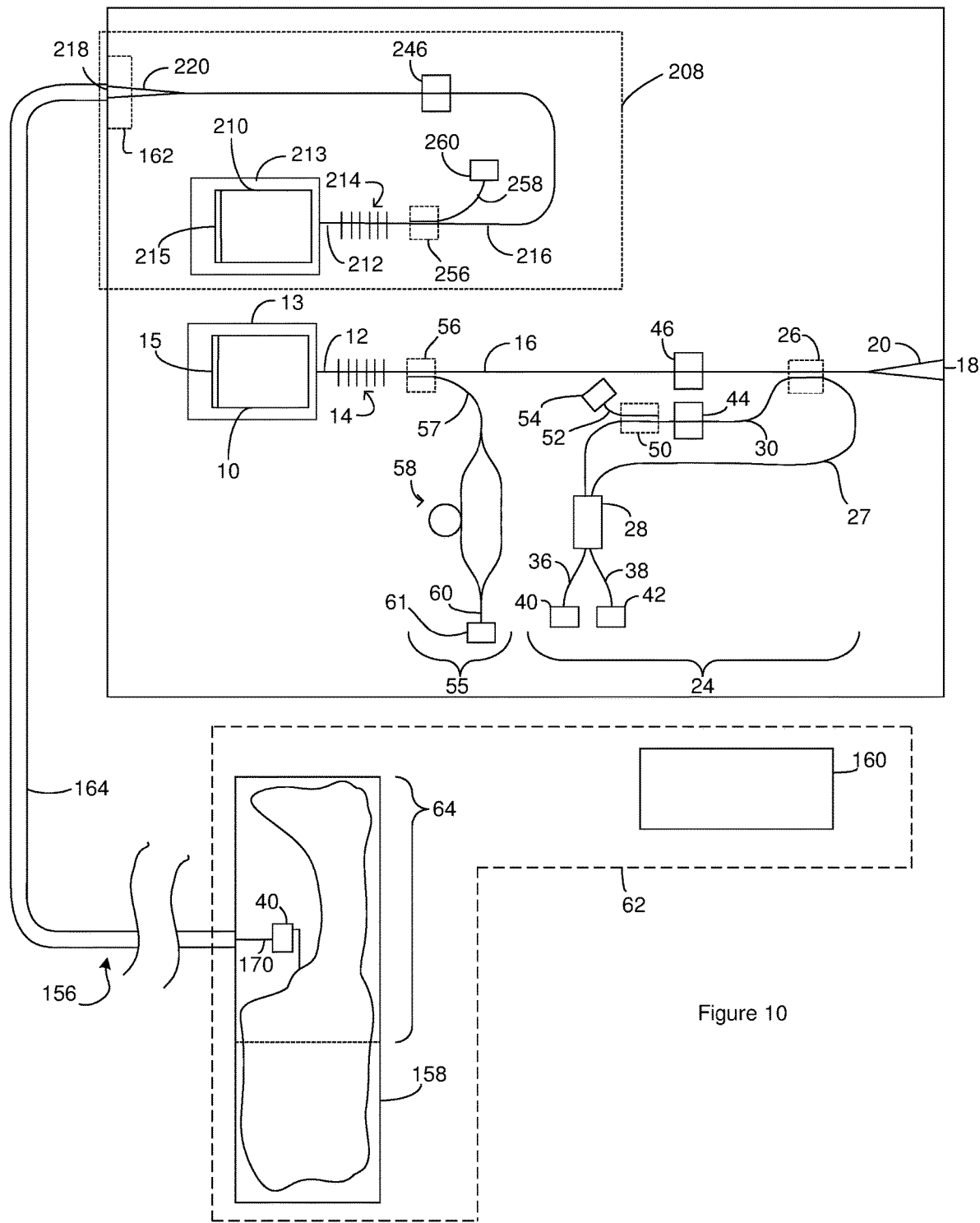
FIG. 10 illustrates the LIDAR chip of FIG. 1 modified to include a data processing branch for generation and transmission of an optical data signal that is transmitted from the LIDAR chip to remote electronics on a communications link.

FIG. 10 illustrates the LIDAR chip of FIG. 1 modified to include a data processing branch 208 for generation and transmission of an optical data signal that is transmitted from the LIDAR chip to the remote electronics 158 on the communications link 156. The remote electronics 158 and the local electronics 160 include the functionality of the electronics 62 as indicated by the dashed line around the remote electronics 158 and the local electronics 160. As is evident from the above discussion, the dashed line being around the remote electronics 158 and the local electronics 160 does not indicate a common location for the remote electronics 158 and the local electronics 160 although a common location is possible.

The data processing branch 208 can include a laser cavity. For instance, the illustrated data processing branch 208 includes a data light source 210 that can include or consist of a data gain medium (not shown) for a laser. The LIDAR chip also includes a data cavity waveguide 212 that receives a light signal from the data light source 210. The data light source 210 can be positioned in a data recess 213 so a facet of the data light source 210 is optically aligned with a facet of the data cavity waveguide 212 to allow the data light source 210 and data cavity waveguide 212 to exchange light signals. The data cavity waveguide 212 carries the light signal to a partial return device 214. The illustrated partial return device 214 is an optical grating such as a Bragg grating. However, other partial return devices 214 can be used; for instance, mirrors can be used in conjunction with echelle gratings and arrayed waveguide gratings.

The partial return device 214 returns a return portion of the light signal to the data cavity waveguide 212 as a return signal. For instance, the data cavity waveguide 212 returns the return signal to the data light source 210 such that the return portion of the light signal travels through the data gain medium. The data light source 210 is configured such that at least a portion of the return signal is added to the light signal that is received at the data cavity waveguides 12. For instance, the data light source 210 can include a highly, fully, or partially reflective device 215 that reflects the return signal received from the gain medium back into the gain medium. As a result, light can resonate between the partial return device 214 and the reflective device 215 so as to form a laser cavity such as a Distributed Bragg Reflector (DBR) laser cavity. A DBR laser cavity has an inherently narrow-linewidth and a longer coherence length than DFB lasers and accordingly improves performance when an object reflecting the LIDAR output signal from the chip is located further away from the chip.

The partial return device 214 passes a portion of the light signal received from the data cavity waveguide 212 to a data waveguide 216 included on the chip. In some instances, the data waveguide 216 includes a taper 220 such as the taper 20 optionally included in the utility waveguide. The portion of the light signal that the data waveguide 216 receives from the partial return device 214 serves as the output of the data laser cavity. The output of the data laser cavity serves as an outgoing data signal on the data waveguide 216. The data waveguide 216 terminates at a facet 218 and carries the outgoing data signal to the facet 218. The facet 218 can be positioned such that the outgoing data signal traveling through the facet 218 exits the LIDAR chip and serves as an optical data signal. For instance, the facet 218 can be positioned at an edge of the chip so the outgoing data signal traveling through the facet 218 exits the LIDAR chip and serves as the optical data signal.

The LIDAR chip also includes a modulator 246 positioned along the data waveguide 216 such that the electronics 62 can modulate the outgoing data signal. Accordingly, the electronics 62 can include a data processing module (not shown) configured to operate the modulator 246 so as to encode data onto the outgoing data signal and accordingly onto the optical data signal. In some instances, the data encoded onto the outgoing data signal was data generated from the LIDAR data signals. Examples of a modulators suitable for use with a LIDAR chip and/or a LIDAR chips constructed on silicon-on-insulator platforms include, but are not limited to, the modulators disclosed in U.S. patent application Ser. No. 12/653,547, filed on Dec. 15, 2009, granted U.S. Pat. No. 8,346,028, entitled "Optical Device Having Modulator Employing Horizontal Electrical Field," and incorporated herein in its entirety.

The data processing branch includes a directional coupler 256 that moves a portion of the outgoing data signal from the data waveguide 216 onto a control waveguide 258. The coupled portion of the outgoing data signal serves as a tapped signal. Although FIG. 10 illustrates a directional coupler 256 moving portion of the outgoing data signal onto the control waveguide 258, other signal-tapping components can be used to move a portion of the outgoing data signal from the data waveguide 216 onto the control waveguide 258. Examples of suitable signal tapping components include, but are not limited to, y-junctions, and MMIs.

The control waveguide 258 carries the tapped signal to a control light sensor 260 that converts the control light signal to an electrical signal that serves as an electrical control signal. Examples of suitable control light sensors 260 include, but are not limited to, PN and PIN types of germanium photodiodes (PDs) and InGaAs photodiodes.

The electronics 62 can include a data source control module (not shown) configured to control the output of the data light source 210. For instance, the data source control module can be configured to tune the output of the data light source 210 in response to the electrical control signal from the control light sensor 260. For instance, the data source control module can tune the power of the outgoing data signal in response to the electrical control signal from the control light sensor 260. In some instances, the data source control module increase the power of the outgoing data signal in response to magnitude of the electrical control signal from the control light sensor 260 falling below a lower power threshold and/or decrease the power of the outgoing data signal in response to magnitude of the electrical control signal from the control light sensor 260 rising above an upper power threshold. This functionality allows the data source control module to set the laser control parameters for optimal performance and adjust for changes in the performance of the data light source 210 due to other effects such as the passage of time and/or changes in temperature.

Figure 11:
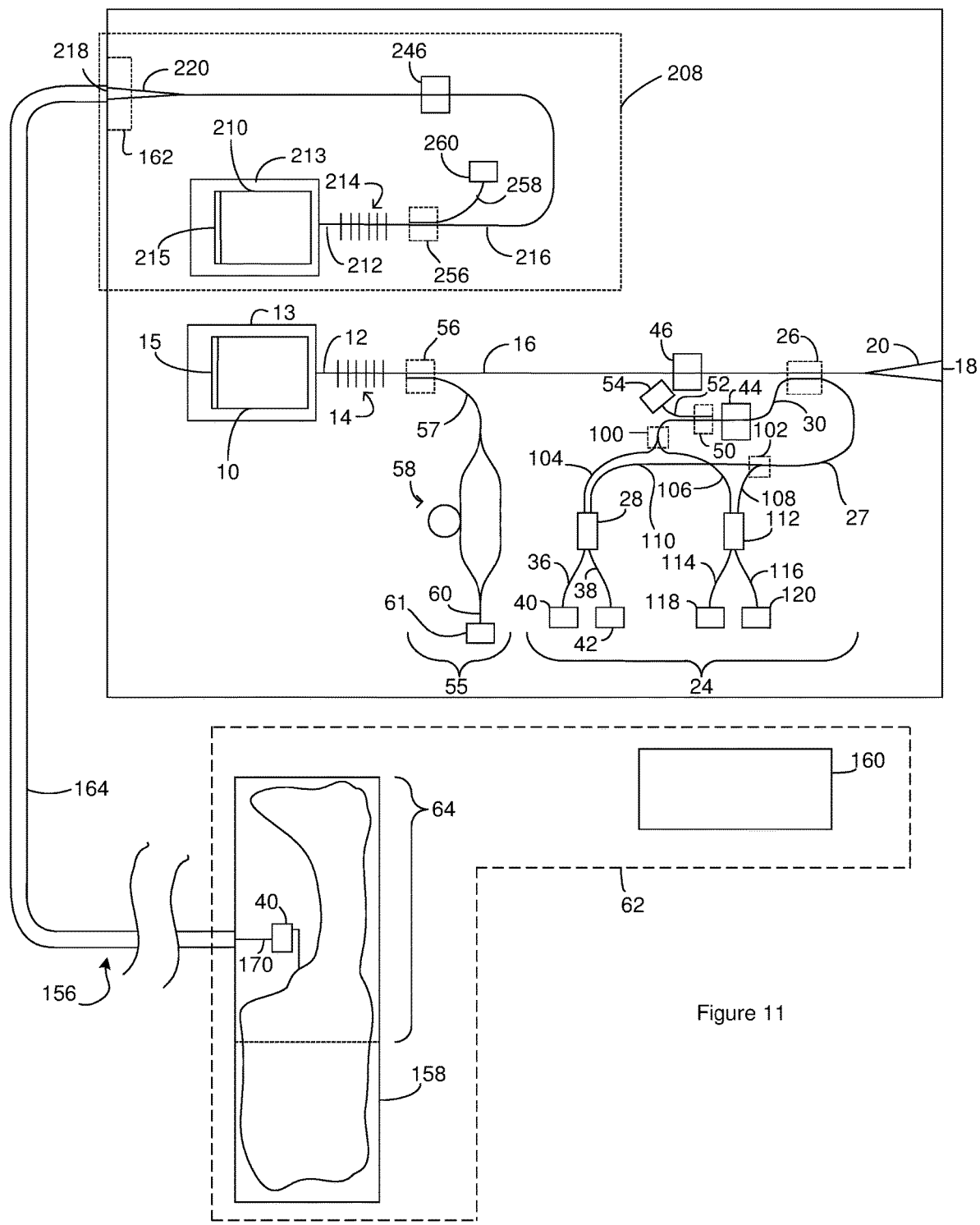
FIG. 11 illustrates the LIDAR chip of FIG. 6A through FIG. 6C modified to include a data processing branch.

Although FIG. 10 illustrates the LIDAR chip of FIG. 1 modified to include a data processing branch, other LIDAR chips can be modified to include a data processing branch. For instance, FIG. 11 illustrates the LIDAR chip of FIG. 6A through FIG. 6C modified to include a data processing branch.

The data processing branch allows the electronics 62 to perform localized processing of data from the LIDAR chip and transmit resulting data to the to the remote electronics 158 on the communications link 156. For instance, the local electronics 160 can receive one or more electronic data signals selected from the group consisting of the first electrical signal, the second electrical signal, the first auxiliary electrical signal, and the second auxiliary electrical signal (electronic LIDAR data signals). The local electronics 160 can process the received electronic LIDAR data signals as discussed above to determine LIDAR data such as the distance and/or radial velocity between the chip and/or vehicle. The local electronics 160 can operate the data light source 210 so as to generate the outgoing data signal on the data waveguide 216. The local electronics 160 can also operate the modulator 246 so as to encode the LIDAR data (distance and/or radial velocity between the reflecting object and the chip and/or vehicle) onto the outgoing data signal and accordingly on the optical data signal. The optical data signal is received by the communications link 156 which carriers the optical data signal to the remote electronics 158.

In this example, the electronic LIDAR data signals are analog signals. However, the local electronics 160 can encode the data onto the outgoing data signal as a digital signal or as an analog signal. Accordingly, the local electronics 160 can receive analog signals but generate a digital optical data signal. As a result, in some instances, the local electronics 160 provide digital processing of the data from the LIDAR chip. In some instances, the local electronics 160 receive analog signals and generate an analog optical data signal. For instance, the local electronics 160 can receive an analog electrical signal from the data branch and encode the received electrical signal onto the optical data signal. As an example, the electronics can receive the first electrical signal and encode the first electrical signal onto an outgoing optical signal and can also receive the second electrical signal and encode the second electrical signal onto another outgoing optical signal. In these examples, the data processing module can include or consist of a modulator driver configured to drive the modulator 246.

In the above example, the LIDAR module transmits LIDAR data to the remote electronics 158. Additionally or alternatively, the data processing branch can be constructed to transmit other data to the remote electronics 158 provided by other sensors co-located with the LIDAR chip. Examples of other data that the data processing branch can transmit to the remote electronics 158 include, but are not limited to, temperature at one or more locations on the LIDAR chip, orientation of the LIDAR chip, and error diagnosis signals.

The LIDAR chip can generate more than one optical data signal. For instance, the LIDAR chip can include more than one data processing branch associated with each data branch 24. Each of the different optical data signals can exit the LIDAR chip from a different facet 218 and/or a different optical port 162. The communications link 156 can include multiple optical fibers that each receives one of the optical data signals.

Figure 12A:
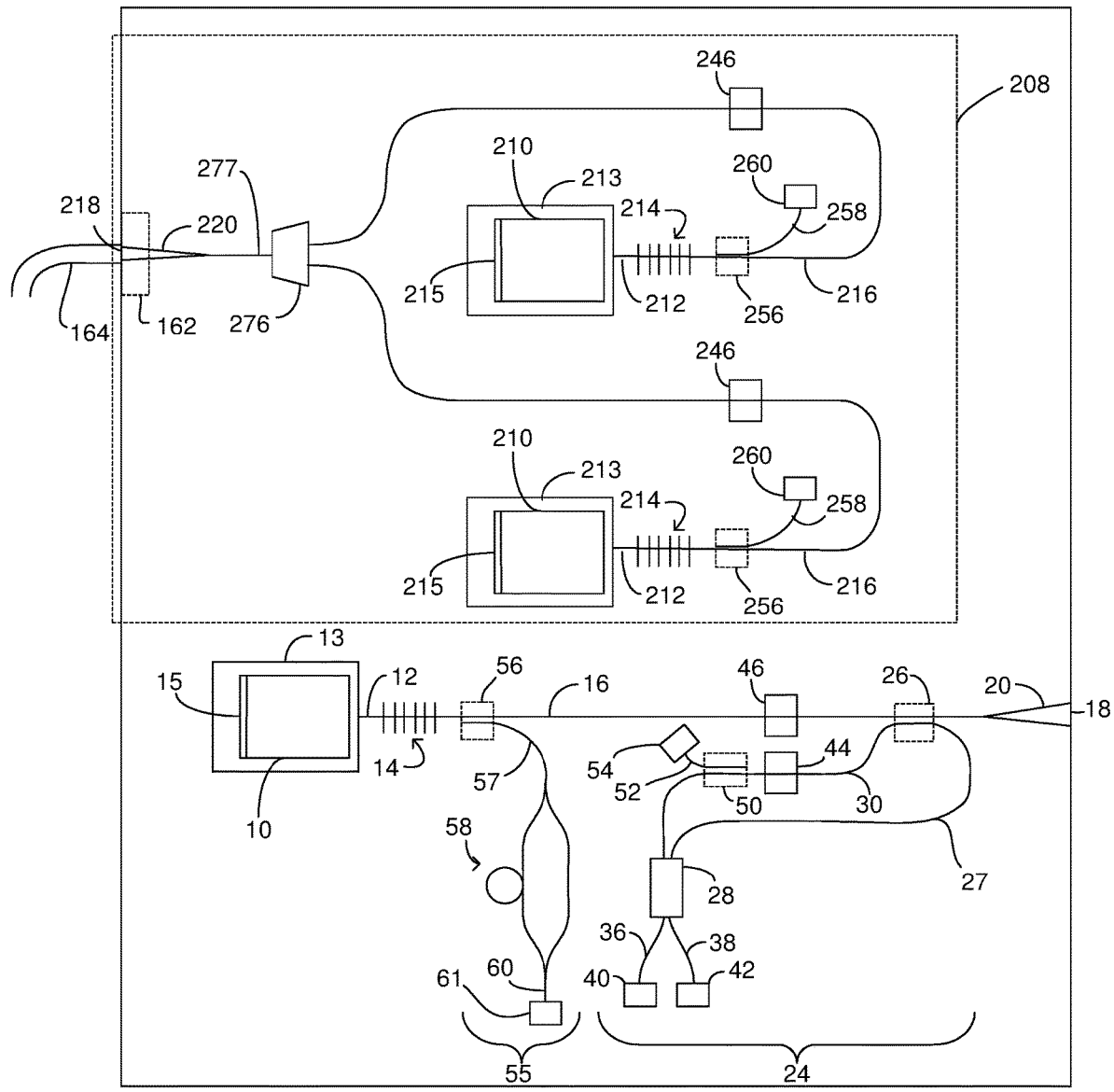
FIG. 12A includes a LIDAR chip with multiple data light source that are each the source of a different outgoing data signal on a data waveguide.

In some instances, the LIDAR chip include a data processing branch 208 that generates multiple different outgoing data signals and combines them into a composite outgoing data signal that is received by the communications link 156. For instance, the LIDAR chip of FIG. 12A includes multiple data light sources 210 that are each the source of a different outgoing data signal on a data waveguide 216. The LIDAR chip also includes an optical combiner 276 that combines the different outgoing data signals so as to form a composite outgoing data signal. The composite outgoing data signal is received on a secondary data waveguides 277 that carries the composite outgoing data signal to an optical port 162 from which the composite outgoing data signal exits from the LIDAR chip as an optical data signal. The optical data signal is received by the communications link 156. The different outgoing data signals can have different wavelengths to enable the remote electronics 158 to process the data from different processing branches 208 as if they are different channels.

Figure 12B:
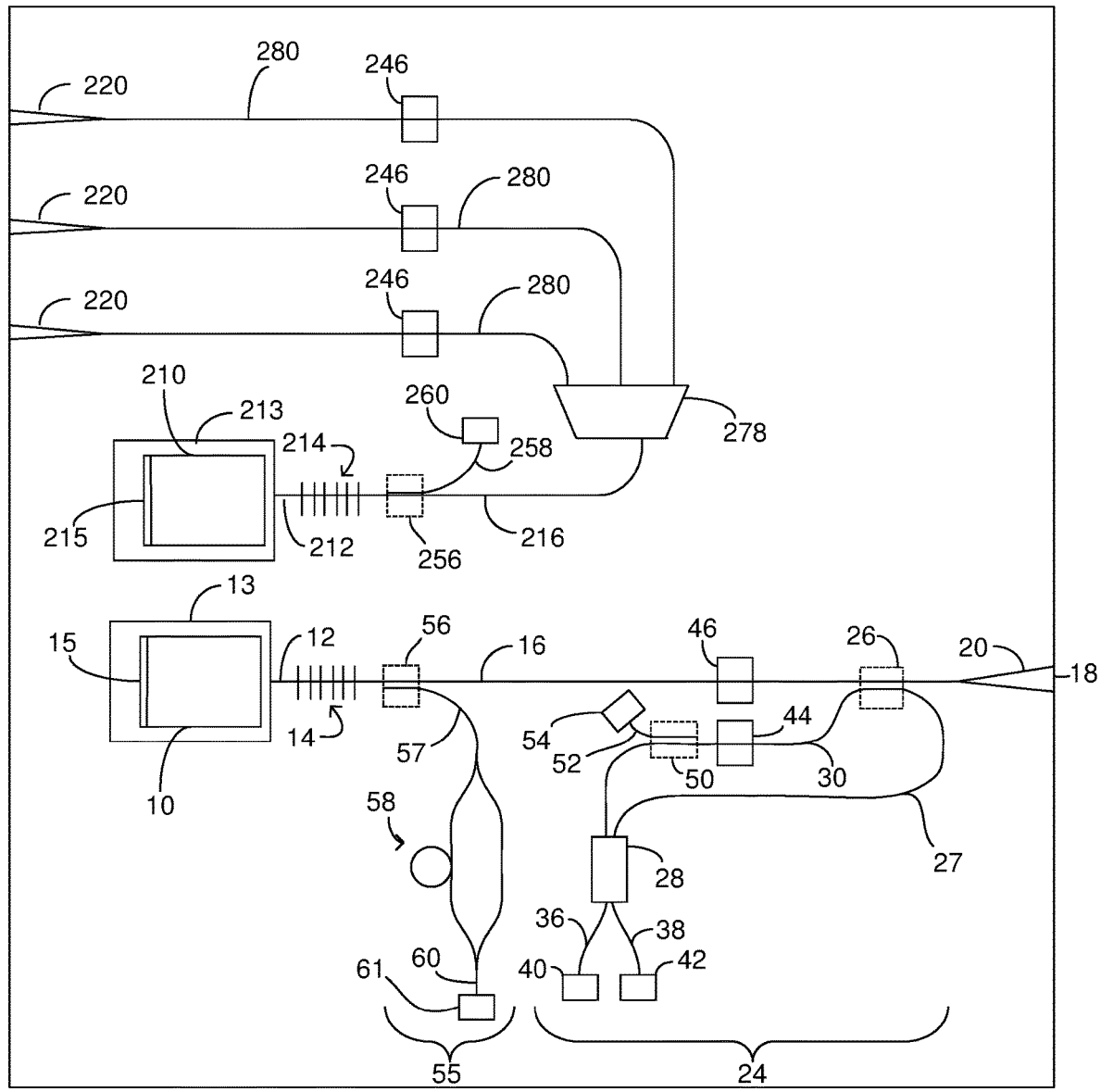
FIG. 12B illustrates the LIDAR chip of FIG. 10 modified to generate multiple different optical data signals.

In some instances, the data processing branch is configured to generate multiple different optical data signals. As an example, FIG. 12B illustrates the LIDAR chip of FIG. 10 modified to generate multiple different optical data signals. The data waveguide 216 carries the outgoing data signal to an optical splitter 278 that divides the outgoing data signal into multiple secondary data signals. Secondary data waveguides 280 each receives one of the secondary data signals. A modulator 246 is positioned along each of the secondary data waveguides 280 and are each configured such that the local electronics 160 can modulate one of the secondary data signals. Accordingly, the local electronics 160 can encode different data onto each of the secondary data signals. Each of the secondary data signals can exit from the LIDAR chip through a facet and can serve as a different optical data signal. When the LIDAR chip generates multiple optical data signals, the communications link 156 can include multiple optical fibers that each receive one of the optical data signals.

The light source 10 and the data light source 210 in the above LIDAR chips can have the same or different wavelengths. In some instances, the light source 10 and the data light source 210 have different wavelengths to reduce cross talk.

Although the light source 10 and the data light source 210 are shown positioned in different recesses (13 and 213), the light source 10 and the data light source 210 can be positioned in the same recess. Although the light source 10 and the data light source 210 are shown as separate from one another, the light source 10 and the data light source 210 can share certain components. For instance, the light source 10 and the data light source 210 can be constructed on the same gain medium. In some instances, the he light source 10 and/or the data light source 210 are each constructed on a different chip that is attached to the LIDAR chip. In some instances, the light source 10 and the data light source 210 are hybridized on the LIDAR chip using an active array such as an RSOA array. In some instances, the RSOA array also includes the partial return device 14 and the partial return device 214. In some instances, the light source 10 and the data light source 210 are hybridized on the LIDAR chip using an active array such as a DFB array.

In FIG. 9 through FIG. 12B, the LIDAR chip is configured such that the data processing branch 208 is optically isolated from the LIDAR branch in that the data processing branch 208 does not exchange light signals with the LIDAR branch. For instance, the one or more data processing branches 208 on the LIDAR chip do not exchange light signals with the portion of the LIDAR chip that generates the one or more composite signals. In these instances, the local electronics provide communication between the one or more data processing branches 208 and the LIDAR branch. In some instances, the LIDAR chip is configured such that the data processing branch 208 is in optical communication with the LIDAR branch.

Figure 13:
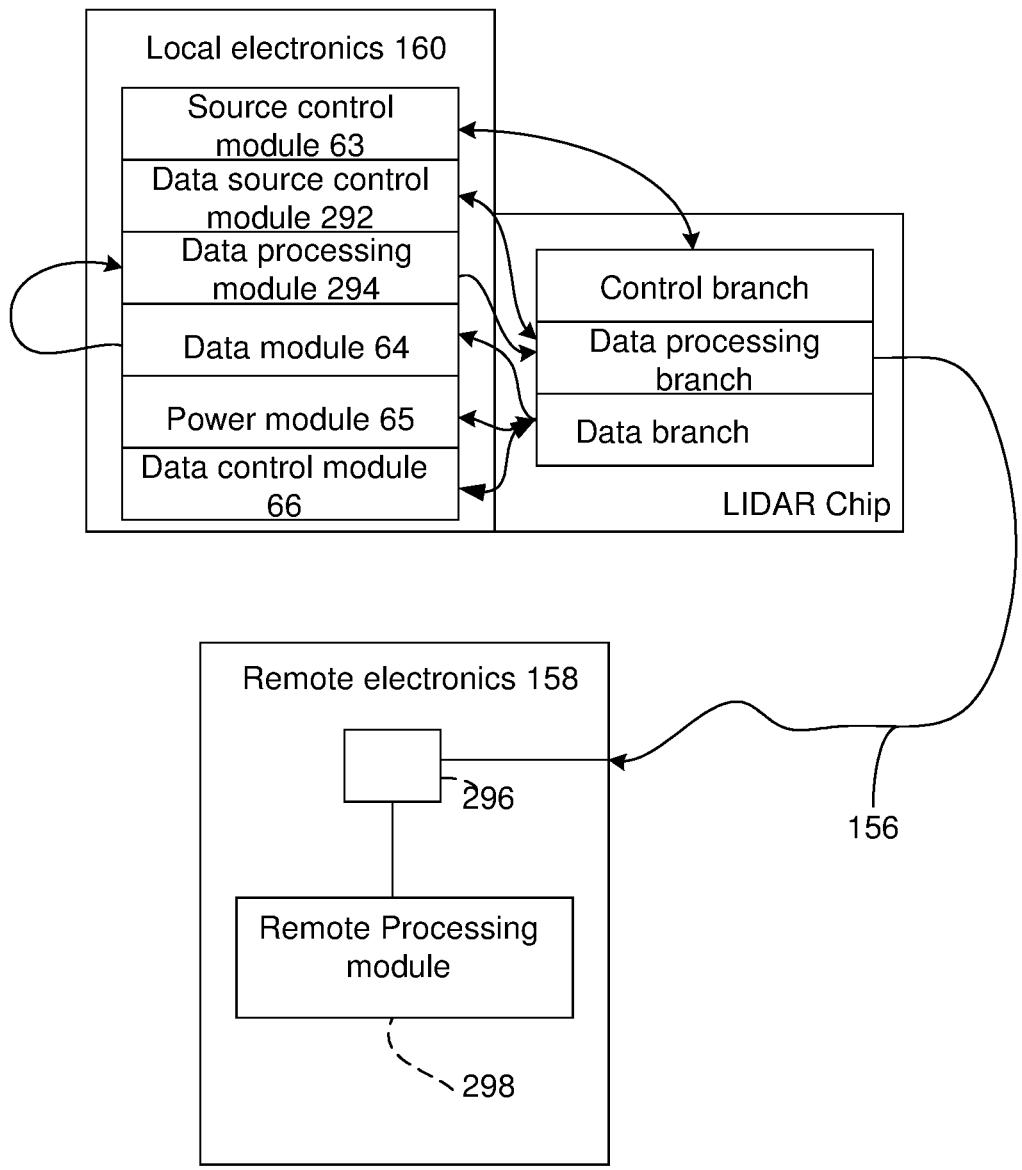
FIG. 13 illustrates an example of the distribution of the electronics functionality between local electronics and the remote electronics.

The functionality of the electronics 62 can be divided between the local electronics 160 and the remote electronics 158. FIG. 13 illustrates one example of the distribution of the electronics functionality between the local electronics 160 and the remote electronics 158. The local electronics include the source control module 63, the data module 64, the power module 65, the data control module 66, the data source control module 292, and the data processing module 294. As is evident from FIG. 13, in some instances, the data module 64 uses signals from the data branch to generate LIDAR data such as the distance and/or radial velocity between a reflecting object and/or chip and/or vehicle. The data processing module 294 can receive the LIDAR data from the data module 64. The data processing module 294 can use the data processing branch to transmit an optical data signal that includes the data to the remote electronics 158 over the communications link 156. As is evident from FIG. 13, the remote electronics 158 can include a light sensor 296 that receives the optical data signal. The light sensor 296 can output an electrical signal generated in response to the optical data signal. For instance, the light sensor 296 can convert the optical data signal to a remote electrical data signal. The remote the remote electronics 158 can include a remote processing module 296 for further processing of the remote electrical data signal.

Suitable electronics for inclusion in the electronics 62, the local electronics 160 and/or the remote electronics 158 can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the laser cavity and/or the data laser cavity is shown as being positioned on the chip, all or a portion of the laser cavity and/or the data laser cavity can be located off the chip. For instance, the utility waveguide 16 can terminate at a second facet through which the outgoing LIDAR signal can enter the utility waveguide 16 from a laser cavity located off the chip.

The above chips can include components in addition to the illustrated components. As one example, optical attenuators (not illustrated) can be positioned along the first detector waveguide 36 and the second detector waveguide 38. The electronics can operate these attenuators so the power of the first portion of the composite sample signal that reaches the first light sensor 40 is the same or about the same as the power of the second portion of the composite sample signal that reaches the second light sensor 42. The electronics can operate the attenuators in response to output from the first light sensor 40 which indicates the power level of the first portion of the composite sample signal and the second light sensor 42 which indicates the power level of the second portion of the composite sample signal.

Although the optical sensor system is disclosed in the context of a vehicle such as car, the optical sensor system can be included in other vehicles. Suitable vehicles include, but are not limited to, trucks, boats, planes, spacecraft, and undersea craft. The vehicle need not be for transportation of people. For instance, the vehicle can be for the transportation of commercial goods, emergency food and medical supplies, and building materials. The optical sensor system can also be used in applications other than vehicles. For instance, the optical sensor system can be employed in other forms of autonomous mobile robots that do not carry people or goods but are used for numerous activities such as surveying, monitoring and maintenance.

Although the optical sensor system is disclosed as including local electronics that are located off the LIDAR chip, all or a portion of the local electronics can be on the LIDAR chip and/or integrated with the LIDAR chip.

Although not shown, the optical sensor system can include a LIDAR chip with one or more optical ports 162 through which digital light signals are transmitted and one or more optical ports through which analog light signals are transmitted. For instance, the LIDAR chip can include one or more data light sources for generating optical data signals and can also include one or more optical ports 162 through which analog light signals are transmitted as disclosed in the context of FIG. 8 through FIG. 9.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a LIDAR chip; and
local electronics that receive a beating signal from the LIDAR chip, the local electronics generating LIDAR data from a frequency of the beating signal,
the LIDAR data indicating a distance and/or a radial velocity between the LIDAR system and a reflecting object located outside of the LIDAR system,
the electronics operating one or more components on the LIDAR chip such that the LIDAR chip transmits an optical data signal carrying the LIDAR data.

2. The system of claim 1, wherein the local electronics are included on the LIDAR chip.

3. The system of claim 1, wherein the signal received from the LIDAR chip is an analog signal.

4. The system of claim 1, wherein the optical data signal is a digital signal.

5. The system of claim 1, wherein the signal received from the LIDAR chip is an analog signal and the optical data signal is a digital signal.

6. The system of claim 1, wherein the optical data signal exits from the LIDAR chip and is received at an optical fiber.

7. The system of claim 1, wherein the LIDAR chip is configured to output a LIDAR output signal that is reflected off a reflecting object located of the LIDAR chip and to receive a portion of the reflected light as a LIDAR input signal.

8. The system of claim 7, wherein the LIDAR chip includes multiple laser cavities.

9. The system of claim 1, wherein the LIDAR chip is configured to guide an outgoing LIDAR signal and to output a LIDAR output signal that can be reflected off a reflecting object located of the LIDAR chip, the LIDAR output signal including light from the outgoing LIDAR signal;
the LIDAR chip configured to receive a portion of the reflected LIDAR output signal light as a LIDAR input signal.

10. The system of claim 9, wherein the beating signal that the local electronics receive from the LIDAR chip is an electrical signal.

11. The system of claim 10, wherein the electrical signal is generated from a light signal that includes light from the LIDAR input signal.

12. The system of claim 11, wherein the LIDAR chip is configured to generate a composite light signal that includes light from a comparative signal and light from a reference signal,
the reference signal including light from the outgoing LIDAR signal that has not exited from the LIDAR chip,
the comparative signal including light from the LIDAR input signal.

13. The system of claim 12, wherein the electrical signal is generated from the composite signal.

14. The system of claim 12, wherein the LIDAR chip includes a first optical component and a second optical component,
the first optical component configured to combines a first portion of the reference signal with a first portion of the comparative signal, the second optical component configured to combine a second portion of the reference signal with a second portion of the comparative signal, and the second portion of the reference signal being phase shifted relative to the first portion of the reference signal.

15. The system of claim 1, wherein the signal received from the LIDAR chip is one of multiple signals that the local electronics receive from the LIDAR chip, the signals received from the LIDAR chip including a first data electrical signal and a second data electrical signal, the first data electrical signal being generated from a light signal that includes light from the first portion of the reference signal and the first portion of the comparative signal, and the second data electrical signal being generated from a light signal that includes light from the second portion of the reference signal and the second portion of the comparative signal.

16. The system of claim 15, wherein the local electronics are configured to perform a Complex Fourier transform on a complex signal, the first data electrical signals being a real component of the complex signal and the second data electrical signals being an imaginary component of the complex signal.

17. The system of claim 1, wherein the signal received from the LIDAR chip is one of multiple signals that the local electronics receive from the LIDAR chip, the signals received from the LIDAR chip including a first data electrical signal and a second data electrical signal.

18. The system of claim 17, wherein the local electronics are configured to perform a Complex Fourier transform on a complex signal, the first data electrical signals being a real component of the complex signal and the second data electrical signals being an imaginary component of the complex signal.

* * * * *